(12) United States Patent
Taylor

(10) Patent No.: US 11,922,602 B2
(45) Date of Patent: *Mar. 5, 2024

(54) VIRTUAL, AUGMENTED, AND MIXED REALITY SYSTEMS AND METHODS

(71) Applicant: MAGIC LEAP, INC., Plantation, FL (US)

(72) Inventor: Robert Blake Taylor, Porter Ranch, CA (US)

(73) Assignee: Magic Leap, Inc., Plantation, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/805,615

(22) Filed: Jun. 6, 2022

(65) Prior Publication Data

US 2022/0309621 A1    Sep. 29, 2022

Related U.S. Application Data

(63) Continuation of application No. 17/110,638, filed on Dec. 3, 2020, now Pat. No. 11,386,529.

(60) Provisional application No. 62/945,024, filed on Dec. 6, 2019.

(51) Int. Cl.
| | |
|---|---|
| *G06T 5/00* | (2006.01) |
| *G06T 7/50* | (2017.01) |
| *G06T 19/00* | (2011.01) |

(52) U.S. Cl.
CPC ........... *G06T 5/002* (2013.01); *G06T 7/50* (2017.01); *G06T 19/006* (2013.01); *G06T 2207/10028* (2013.01)

(58) Field of Classification Search
CPC ......... G06T 5/002; G06T 7/50; G06T 19/006; G06T 2207/10028; G06F 3/013; G06F 15/20
See application file for complete search history.

(56) References Cited

U.S. PATENT DOCUMENTS

| | | |
|---|---|---|
| 5,754,270 A | 5/1998 | Rehse et al. |
| 10,616,567 B1 | 4/2020 | Clemens et al. |
| 11,386,529 B2 * | 7/2022 | Taylor ................. G06T 7/50 |
| 2006/0056727 A1 | 3/2006 | Jones et al. |
| 2008/0304013 A1 | 12/2008 | Seo |
| 2010/0085351 A1 | 4/2010 | Deb et al. |
| 2010/0118127 A1 | 5/2010 | Nam et al. |
| 2010/0156897 A1 | 6/2010 | Blumenthal et al. |
| 2011/0157155 A1 | 6/2011 | Turner et al. |

(Continued)

OTHER PUBLICATIONS

Foreign NOA for CN Patent Appln. No. 202080038034.3 dated Jan. 11, 2023.

(Continued)

*Primary Examiner* — Jeffery A Brier
(74) *Attorney, Agent, or Firm* — Vista IP Law Group, LLP

(57) ABSTRACT

A method for displaying a three dimensional ("3D") image includes rendering a frame of 3D image data. The method also includes analyzing the frame of 3D image data to generate best known depth data. The method further includes using the best known depth data to segment the 3D image data into near and far frames of two dimensional ("2D") image data corresponding to near and far depths respectively. Moreover, the method includes displaying near and far 2D image frames corresponding to the near and far frames of 2D image data at near and far depths to a user respectively.

19 Claims, 17 Drawing Sheets

(56) References Cited

U.S. PATENT DOCUMENTS

| | | |
|---|---|---|
| 2013/0069942 A1 | 3/2013 | Woo et al. |
| 2014/0049536 A1 | 2/2014 | Neuman et al. |
| 2014/0313290 A1 | 10/2014 | Tech et al. |
| 2014/0375772 A1 | 12/2014 | Gabara |
| 2016/0147067 A1 | 5/2016 | Hua et al. |
| 2017/0007450 A1 | 1/2017 | Samec et al. |
| 2017/0053450 A1 | 2/2017 | Rodriguez et al. |
| 2017/0124717 A1 | 5/2017 | Baruch et al. |
| 2017/0160798 A1 | 6/2017 | Lanman et al. |
| 2017/0316762 A1 | 11/2017 | El-Ghoroury |
| 2018/0053284 A1 | 2/2018 | Rodriguez et al. |
| 2018/0120573 A1 | 5/2018 | Ninan et al. |
| 2018/0137607 A1 | 5/2018 | Mishma et al. |
| 2018/0262758 A1 | 9/2018 | El-ghoroury et al. |
| 2019/0035165 A1 | 1/2019 | Gausebeck |
| 2019/0162950 A1 | 5/2019 | Lapstun |
| 2019/0172216 A1 | 6/2019 | Ninan et al. |
| 2019/0220089 A1 | 7/2019 | Kakizawa et al. |

OTHER PUBLICATIONS

Final Office Action for U.S. Appl. No. 17/368,096 dated Feb. 23, 2023.
Foreign Response for EP Patent Appln. No. 20810449.7 dated Jan. 2, 2023.
Non-Final Office Action for U.S. Appl. No. 16/872,792 dated Dec. 23, 2020.
PCT International Search Report and Written Opinion for International Appln. No. PCT/US20/32459, Applicant Magic Leap, Inc. dated Aug. 6, 2020 (14 pages).
Amendment Response for U.S. Appl. No. 16/872,792 dated Mar. 23, 2021.
Notice of Allowance for U.S. Appl. No. 16/872,792 dated Apr. 5, 2021.
Non-Final Office Action for U.S. Appl. No. 17/110,638 dated Jul. 22, 2021.
Amendment Response to NFOA for U.S. Appl. No. 17/110,638 dated Oct. 20, 2021.
Notice of Allowance for U.S. Appl. No. 17/110,638 dated Nov. 24, 2021.
PCT International Preliminary Report on Patentability for International Appln. No. PCT/US20/32459, Applicant Magic Leap, Inc., dated Nov. 16, 2021 (12 pages).
PCT International Search Report and Written Opinion for International Appln. No. PCT/US20/63068, Applicant Magic Leap, Inc. dated Mar. 3, 2021 (14 pages).
Notice of Allowance for U.S. Appl. No. 17/110,638 dated Mar. 8, 2022.
Non-Final Office Action for U.S. Appl. No. 17/368,096 dated Aug. 30, 2022.
Foreign Response for CN Patent Appln. No. 202080038034.3 dated Nov. 18, 2022.
Amendment Response for U.S. Appl. No. 17/368,096 dated Nov. 30, 2022.
Extended European Search Report for EP Patent Appln. No. 20897295.0 dated Dec. 21, 2022.
Extended European Search Report for EP Patent Appln. No. 20810449.7 dated Jun. 13, 2022.
Foreign OA for CN Patent Appln. No. 202080038034.3 dated Jul. 20, 2022.
Amendment After Final for U.S. Appl. No. 17/368,096 dated Apr. 20, 2023.
Foreign OA for CN Patent Appln. No. 202080084088.3 dated Apr. 18, 2023 (with English translation).
Notice of Allowance for U.S. Appl. No. 17/368,096 dated May 18, 2023.
Notice of Allowance for U.S. Appl. No. 17/368,096 dated Jun. 14, 2023.
Foreign OA for JP Patent Appln. No. 2021-569068 dated Jul. 26, 2023 (with English translation).
Foreign Response for CN Patent Appln. No. 202080084088.3 dated Aug. 2, 2023.
Foreign NOA for CN Patent Appln. No. 202080084088.3 dated Aug. 25, 2023.
Foreign Response for JP Patent Appln. No. 2021-569068 dated Oct. 17, 2023.
Foreign NOA for JP Patent Appln. No. 2021-569068 dated Dec. 22, 2023.

* cited by examiner

VIRTUAL, AUGMENTED, AND MIXED REALITY SYSTEMS AND METHODS

CROSS-REFERENCE TO RELATED APPLICATIONS

The present application is a continuation U.S. patent application Ser. No. 17/110,638, filed Dec. 3, 2020, and entitled "VIRTUAL, AUGMENTED, AND MIXED REALITY SYSTEMS AND METHODS," which claims the benefit of U.S. Provisional Application Ser. No. 62/945,024, filed on Dec. 6, 2019 and entitled "VIRTUAL, AUGMENTED, AND MIXED REALITY SYSTEMS AND METHODS."

The present application is related to U.S. Provisional Patent Application Ser. No. 62/851,773 filed on May 23, 2019 and entitled "VIRTUAL, AUGMENTED, AND MIXED REALITY SYSTEMS AND METHODS"; U.S. Utility patent application Ser. No. 14/555,585 filed on Nov. 27, 2014 and entitled "VIRTUAL AND AUGMENTED REALITY SYSTEMS AND METHODS"; and U.S. Utility patent application Ser. No. 14/738,877 filed on Jun. 13, 2015 and entitled "METHODS AND SYSTEMS FOR CREATING VIRTUAL AND AUGMENTED REALITY."

The contents of the patent applications identified herein are hereby expressly and fully incorporated by reference in their entirety, as though set forth in full. Described in the aforementioned incorporated patent applications are various embodiments of virtual, augmented, and mixed reality systems and methods. Described herein are further embodiments of virtual, augmented, and mixed reality systems and methods.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present disclosure relates to virtual reality, augmented reality, and mixed reality imaging, visualization, and display systems and methods. In particular, the present disclosure relates to virtual reality, augmented reality, and mixed reality imaging, visualization, and display systems and methods for blurring display content.

BACKGROUND

Modern computing and display technologies have facilitated the development of virtual reality (VR), augmented reality (AR), and mixed reality (MR) systems. VR systems create a simulated environment for a user to experience. This can be done by presenting computer-generated imagery to the user through a head-mounted display. This imagery creates a sensory experience which immerses the user in the simulated environment. A VR scenario typically involves presentation of only computer-generated imagery rather than also including actual real-world imagery.

AR systems generally supplement a real-world environment with simulated elements. For example, AR systems may provide a user with a view of the surrounding real-world environment via a head-mounted display. However, computer-generated imagery can also be presented on the display to enhance the real-world environment. This computer-generated imagery can include elements which are contextually-related to the real-world environment. Such elements can include simulated text, images, objects, etc. MR systems also introduce simulated objects into a real-world environment, but these objects typically feature a greater degree of interactivity than in AR systems. The simulated elements can often times be interactive in real time.

FIG. 1 depicts an example AR/MR scene 2 where a user sees a real-world park setting 6 featuring people, trees, buildings in the background, and a concrete platform 20. In addition to these items, computer-generated imagery is also presented to the user. The computer-generated imagery can include, for example, a robot statue 10 standing upon the real-world platform 20, and a cartoon-like avatar character 12 flying by which seems to be a personification of a bumble bee, even though these elements 12, 10 are not actually present in the real-world environment.

Various optical systems generate images at various depths for displaying VR, AR, or MR scenarios. Some such optical systems are described in U.S. Utility patent application Ser. No. 14/555,585 filed on Nov. 27, 2014, the contents of which have been previously incorporated by reference herein. Other such optical systems for displaying MR experiences are described in U.S. Utility patent application Ser. No. 14/738,877, the contents of which have been previously incorporated by reference herein.

VR/AR/MR systems can operate in a variety of display modes, including blended light field and discrete light field modes. In a blended light field mode ("blended mode") a display presents a synthetic light field including images simultaneously or nearly simultaneously displayed at two or more discrete depth planes. In a discrete light field mode ("discrete mode") a display presents a synthetic light field including an image displayed at a single depth plane. The illuminated depth plane is controllable in discrete mode. Some VR/AR/MR systems include eye-tracking subsystems for determining a viewer's point of focus. Such systems can illuminate the depth plane corresponding to the viewer's point of focus.

Because the human visual perception system is complex, it is challenging to produce a VR/AR/MR technology that facilitates a comfortable, natural-feeling, rich presentation of virtual image elements amongst other virtual or real-world imagery elements. Three dimensional ("3D") image display systems experience the vergence-accommodation conflict problem. This problem occurs when two optical depth related biological processes send conflicting depth signals to a viewer/user's brain. Vergence relates to the tendency of the viewer's eye(s) to rotate to align the optical axis (axes) with an object of the viewer's attention at a distance. In binocular systems, the point at which the optical axes intersect can be called a "point of vergence." The amount of rotation of the viewer's eye(s) during vergence is interpreted by the viewer's brain as an estimated depth. Accommodation relates to the tendency of the lens(es) of the viewer's eye(s) to focus so that an object of the viewer's attention at a distance. The focus of the viewer's eye(s) during vergence is interpreted by the viewer's brain as another estimated depth. When the vergence and accommodation signals are interpreted by the viewer's brain as the same or similar estimated depths, the 3D viewing experience is natural and comfortable for the viewer. On the other hand, when the vergence and accommodation signals are interpreted by the viewer's brain as the substantially different estimated depths, the 3D viewing experience is suboptimal for the viewer, and may result in discomfort (eyestrain, headaches, etc.) and fatigue. Such problems are known as vergence-accommodation conflict.

Blurring is another depth cue associated with accommodation. When the viewer's eyes are focused/accommodated to a particular optical depth, objects located at other optical depths naturally appear out of focus, i.e., blurry. Blended mode displays achieve blurring naturally by presenting images at two or more depth planes. Some discrete mode displays present images without blurring, resulting in some degree of vergence-accommodation conflict and viewer discomfort. Even blended mode displays may benefit from blurring of some 3D image content. For instance, 3D image content located at the minimal distance ("min clip") at which content is visible (i.e., very close to the viewer's eyes) is naturally blurry, even when a viewer is focused on that content. Similarly, 3D image content located at the maximum distance ("far clip") at which content is visible (i.e., toward an infinite distance away from the viewer's eyes) is naturally blurry, even when a viewer is focused on that content.

Portable VR/AR/MR systems also have other limitations such as size and portability issues, battery life issues, system overheating issues, processing power, memory, bandwidth, data sources, component latency, and other system and optical challenges, which can negatively impact VR/AR/MR system performance. These other limitations must be taken into consideration when implementing 3D image rendering techniques for natural vergence and accommodation.

Improved systems and techniques are needed for processing image data and displaying images, including, for example, systems and techniques for rendering and displaying 3D images to viewers/users while minimizing vergence-accommodation conflict, and systems and techniques for minimizing demands on limited graphical processing capabilities of portable VR/AR/MR systems while doing so. Improved systems and techniques are needed for addressing these issues. The systems and methods described herein are configured to address these and other challenges.

What is needed is a technique or techniques to improve over legacy techniques and/or over other considered approaches. Some of the approaches described in this background section are approaches that could be pursued, but not necessarily approaches that have been previously conceived or pursued.

SUMMARY

In one embodiment, a method for displaying a three dimensional ("3D") image in discrete mode includes rendering a frame of 3D image data. The method also includes analyzing the frame of 3D image data to generate best known depth data. The method further includes identifying a first set of virtual objects/pixels having respective best known depths in a first depth range. Moreover, the method includes identifying a second set of virtual objects/pixels having respective best known depths in a second range. In addition, the method includes blurring the second set of virtual objects/pixels based on respective best known depths to generate a blurred second set of virtual objects/pixels. The method also includes displaying the first set of virtual objects/pixels and the blurred second set of virtual objects/pixels to a user at a first depth corresponding to the first depth range.

In one or more embodiments, the method also includes blurring the first set of virtual objects/pixels based on respective best known depths to generate blurred first set of virtual objects/pixels, and displaying the second set of virtual objects/pixels and the blurred first set of virtual objects/pixels to the user at a second depth corresponding to the second depth range. The method may also include projecting the frame of 3D image data to generate a two dimensional ("2D") image frame. Blurring the second set of virtual objects/pixels may include blurring portions of the 2D image frame corresponding to the second set of virtual objects/pixels to generate a partially blurred 2D image frame. Displaying the first set of virtual objects/pixels and the blurred second set of virtual objects/pixels to the user may include displaying the partially blurred 2D image frame to the user. The method may also include combining the first set of virtual objects/pixels and the blurred second set of virtual objects/pixels to generate a partially blurred two dimensional ("2D") image frame. Displaying the first set of virtual objects/pixels and the blurred second set of virtual objects/pixels to the user may include displaying the partially blurred 2D image frame to the user. Blurring the second set of virtual objects/pixels based on respective best known depths to generate the blurred second set of virtual objects/pixels may include blurring each of the second set of virtual objects/pixels to the same degree.

In one or more embodiments, blurring the second set of virtual objects/pixels based on respective best known depths to generate the blurred second set of virtual objects/pixels includes variably blurring each of the second set of virtual objects/pixels, and respective degrees of blurring of each of the second set of virtual objects/pixels are proportional to the respective best known depths. The degrees of blurring may be directly proportional to the respective best known depths. The second depth range may include the far clip. The far clip may correspond to about 1.15 diopters.

In one or more embodiments, blurring the second set of virtual objects/pixels based on respective best known depths to generate the blurred second set of virtual objects/pixels includes maximally blurring an object/pixel when a best known depth of the object/pixel is greater than a maximum threshold. Maximally blurring the object/pixel may include deleting the object/pixel. The degrees of blurring may be inversely proportional to the respective best known depths. The second depth range may include the min clip. The min clip may correspond to about 2.7 diopters.

In one or more embodiments, blurring the second set of virtual objects/pixels based on respective best known depths to generate the blurred second set of virtual objects/pixels includes maximally blurring an object/pixel when a best known depth of the object/pixel is lesser than a minimum threshold. Maximally blurring the object/pixel includes deleting the object/pixel. The degrees of blurring may be linearly, logarithmically, or asymmetrically proportional to the respective best known depths.

In another embodiment, a method for displaying a three dimensional ("3D") image in blended mode includes rendering a frame of 3D image data. The method also includes analyzing the frame of 3D image data to generate best known depth data. The method further includes identifying a virtual object/pixel having a best known depth outside of a sharp display range. Moreover, the method includes blurring the virtual object/pixel based on the best known depth to generate a blurred virtual object/pixel. In addition, the method includes using the best known depth data to segment the 3D image data into near and far frames of two dimensional ("2D") image data corresponding to near and far depths respectively, at least one of the near and far frames of 2D image data includes the blurred virtual object/pixel. The method also includes displaying near and far 2D image frames corresponding to the near and far frames of 2D image data at near and far depths to a user respectively.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The drawings described below are for illustration purposes only. The drawings are not intended to limit the scope of the present disclosure. This patent or application file contains at least one drawing executed in color. Copies of this patent or patent application publication with color drawings will be provided by the U.S. Patent and Trademark Office upon request and payment of the necessary fee.

Figure 1:
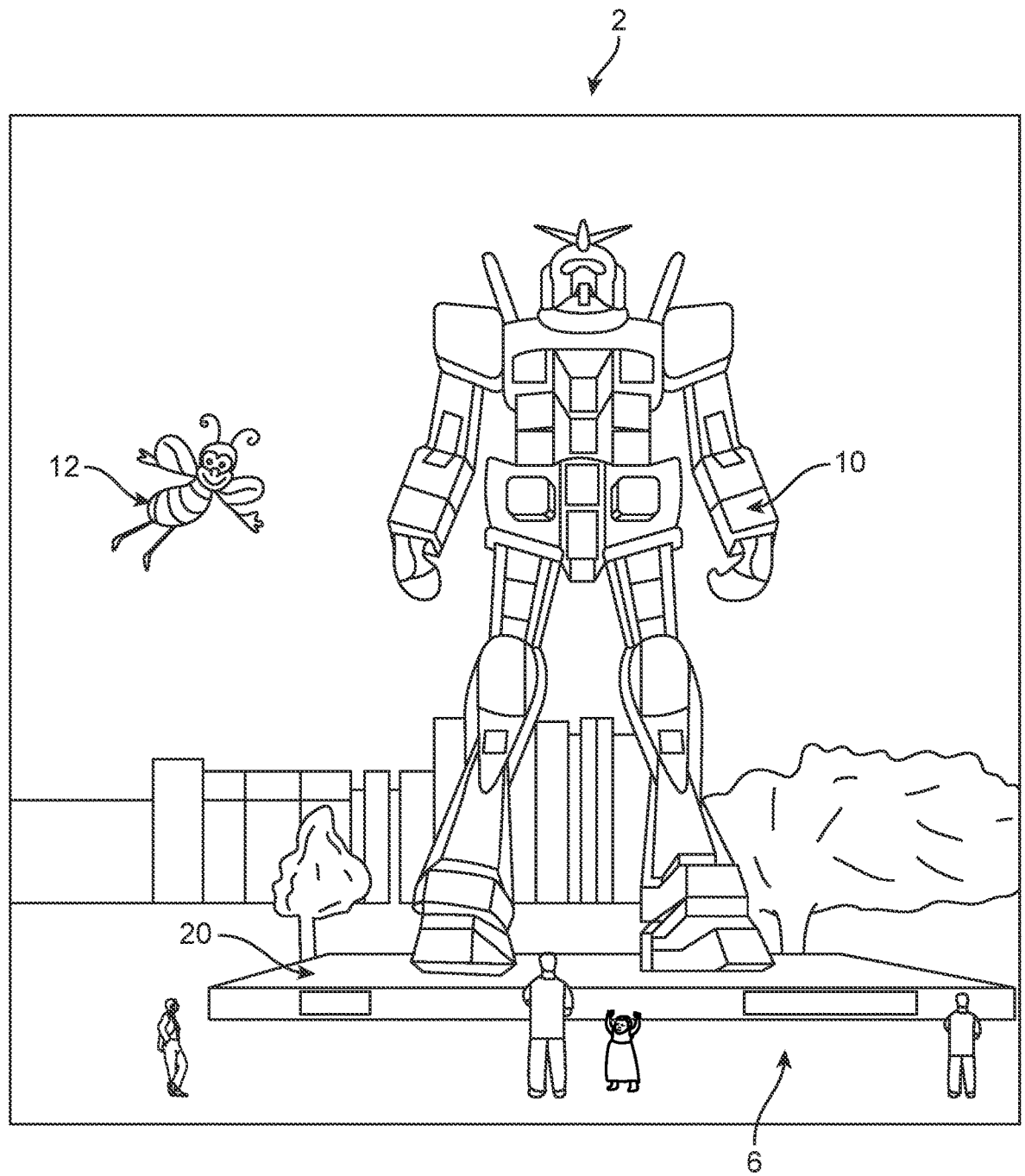
Figure 2:
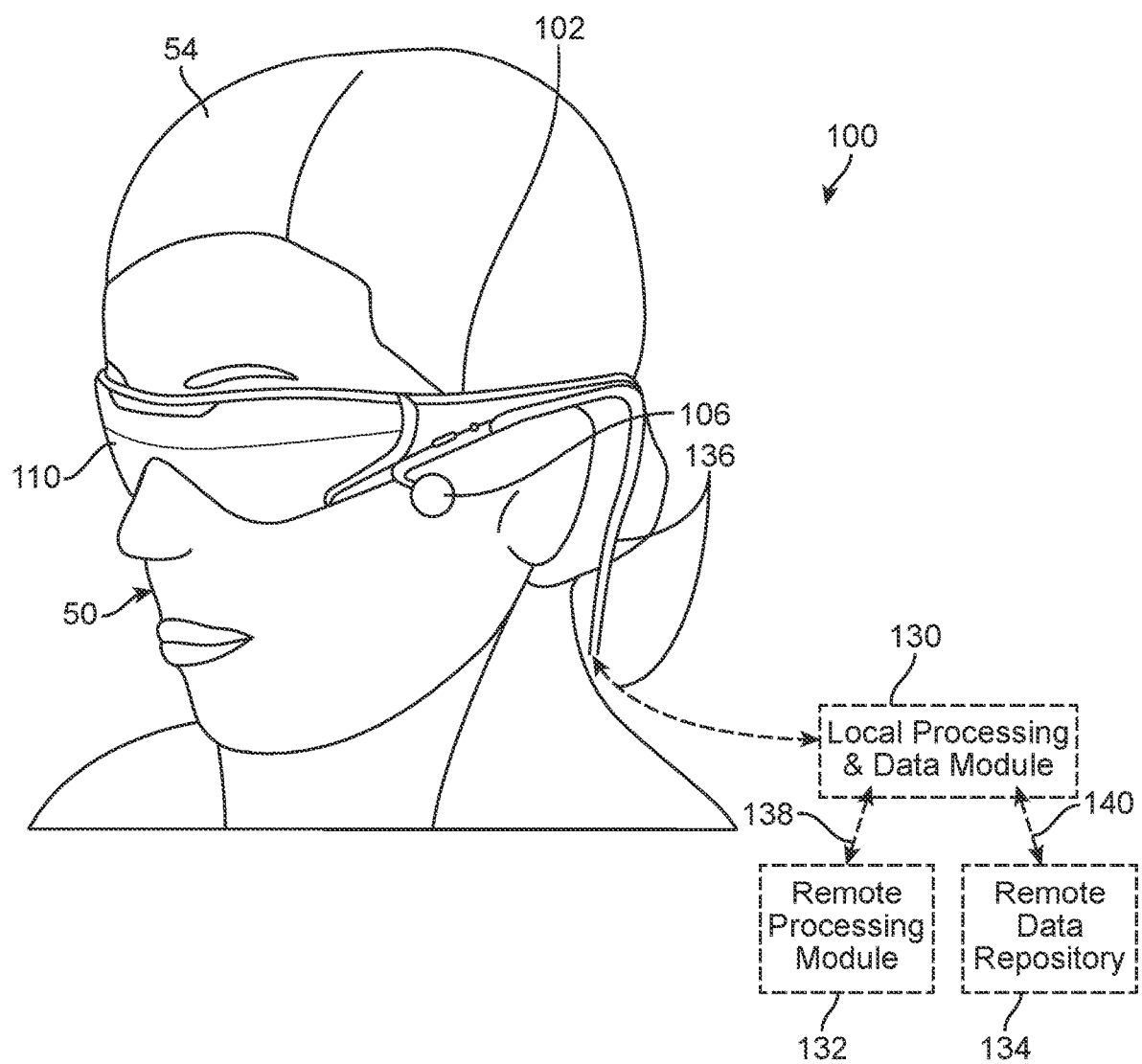
Figure 3:
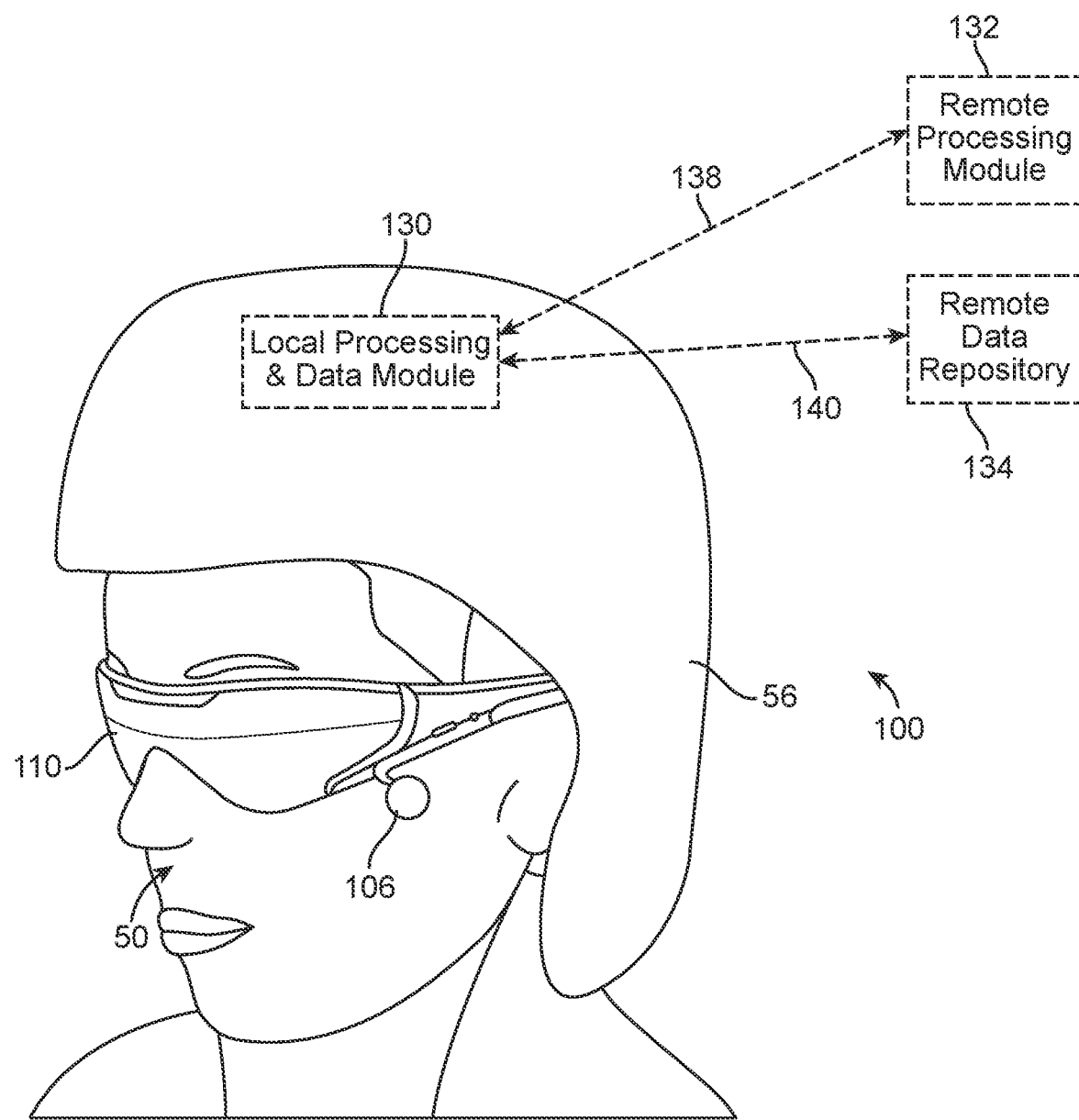
Figure 4:
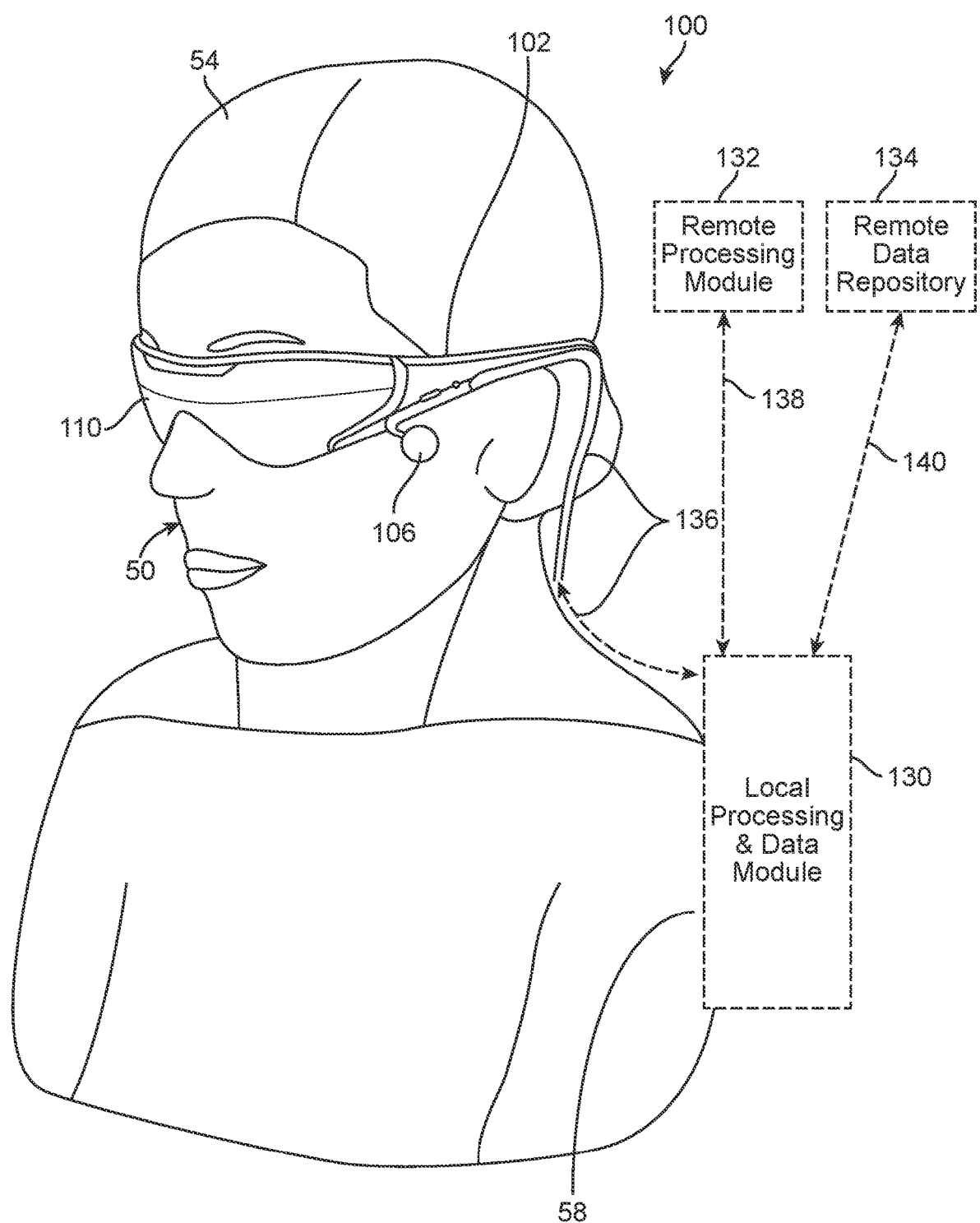

The drawings illustrate the design and utility of various embodiments of the present disclosure. It should be noted that the figures are not drawn to scale and that elements of similar structures or functions are represented by like reference numerals throughout the figures. In order to better appreciate how to obtain the recited and other advantages and objects of various embodiments of the disclosure, a more detailed description of the present disclosure will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings.

FIG. 1 illustrates a user's view of an AR/MR scene using an example AR system.

FIGS. 2-5 schematically depict users using VR/AR/MR systems according to some embodiments.

Figure 6:
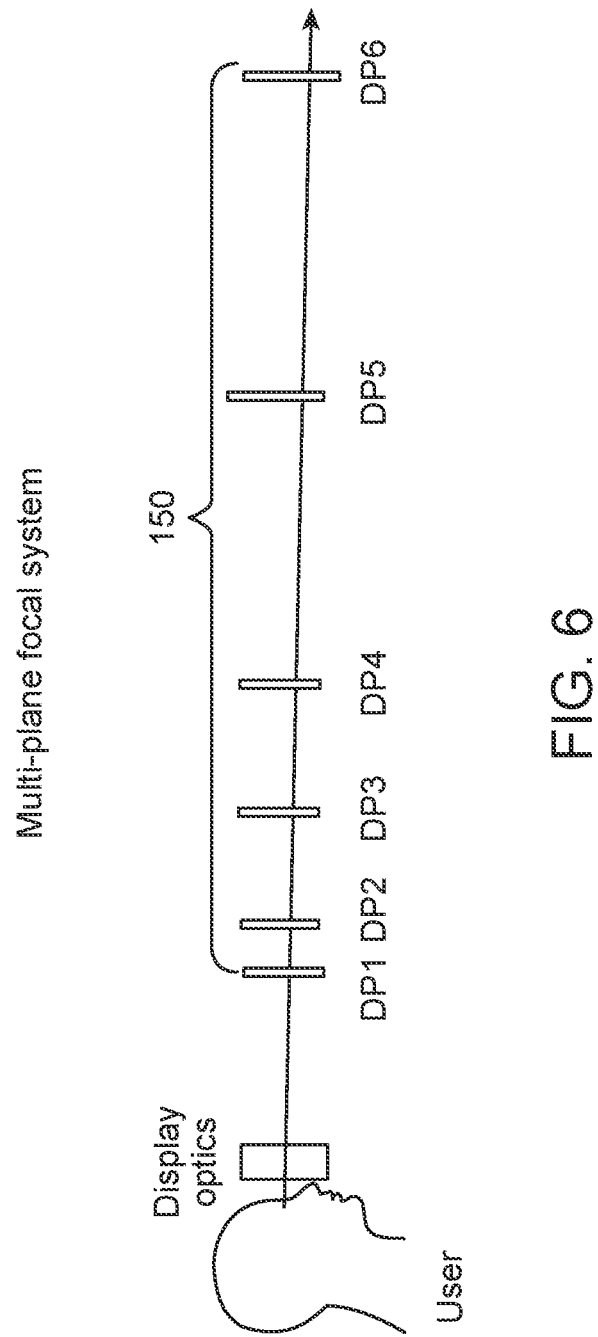

FIG. 6 schematically depicts various planes of a multi-plane focal system according to some embodiments.

Figure 7:
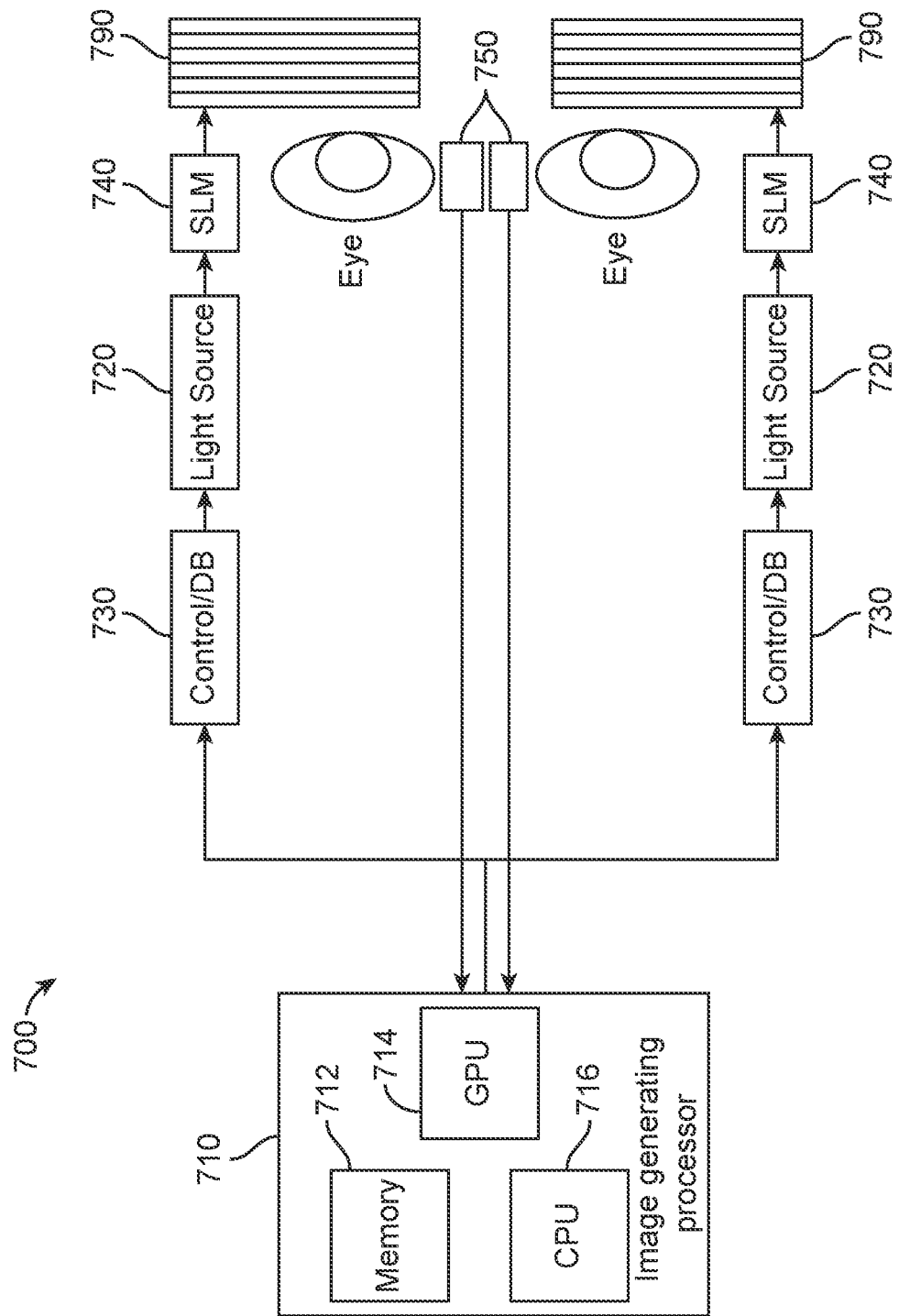

FIG. 7 schematically depicts a VR/AR/MR system according to some embodiments.

Figure 8A:
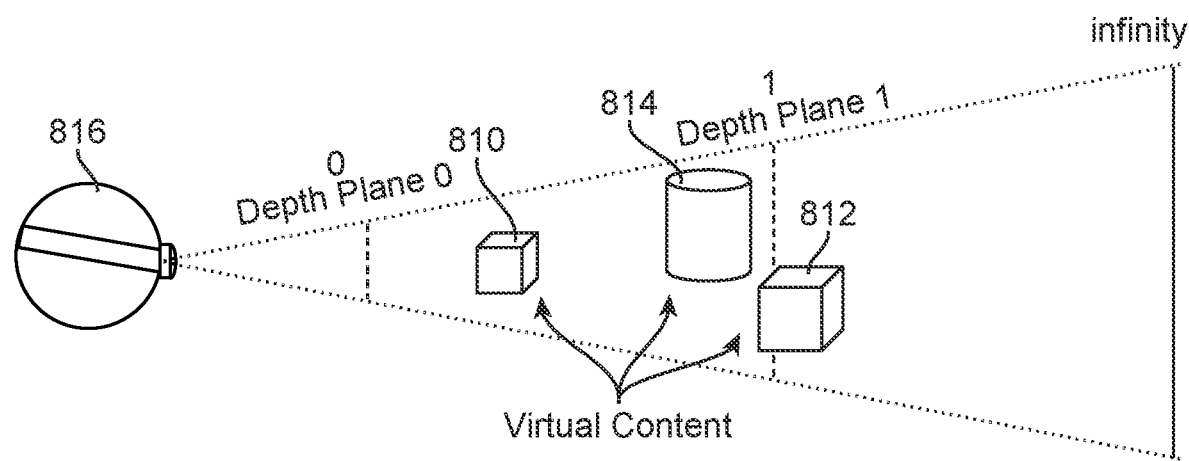
Figure 8B:
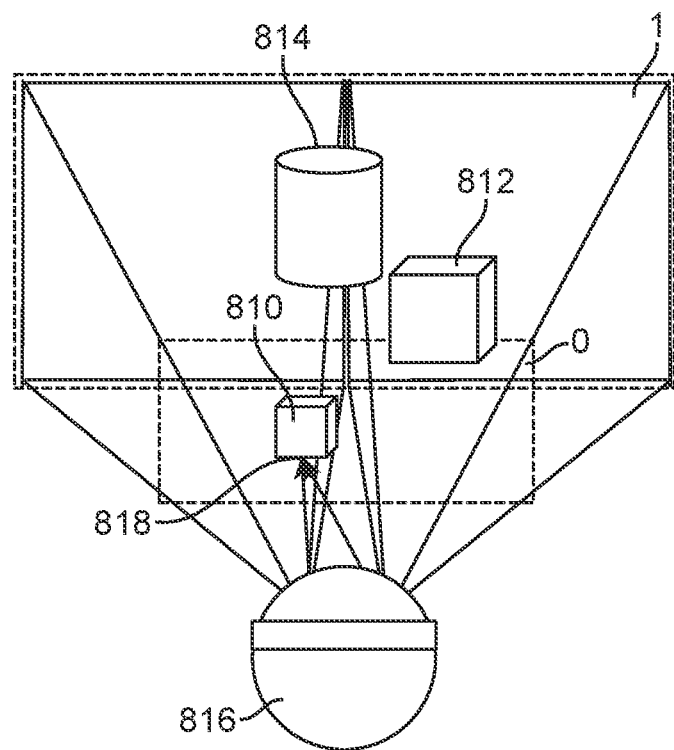

FIGS. 8A and 8B schematically depict a 3D image including a plurality of virtual objects from a side perspective view (FIG. 8A) and a rear perspective view (FIG. 8B) according to some embodiments.

Figure 9A:
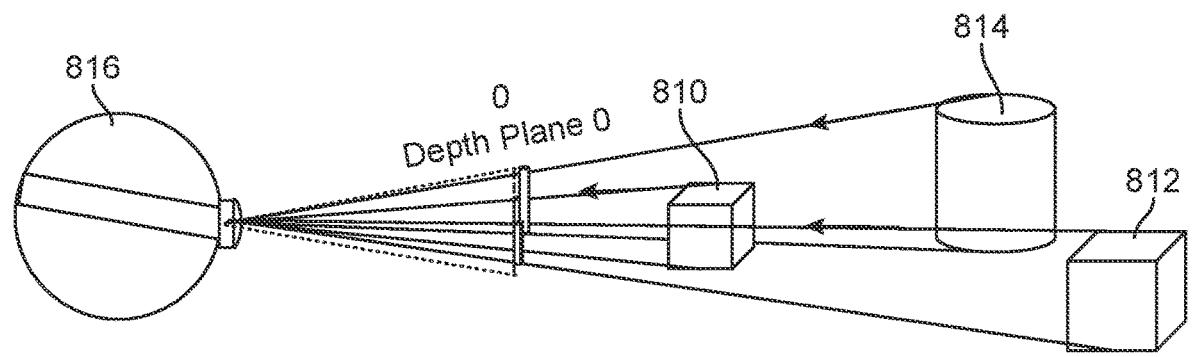
Figure 9B:
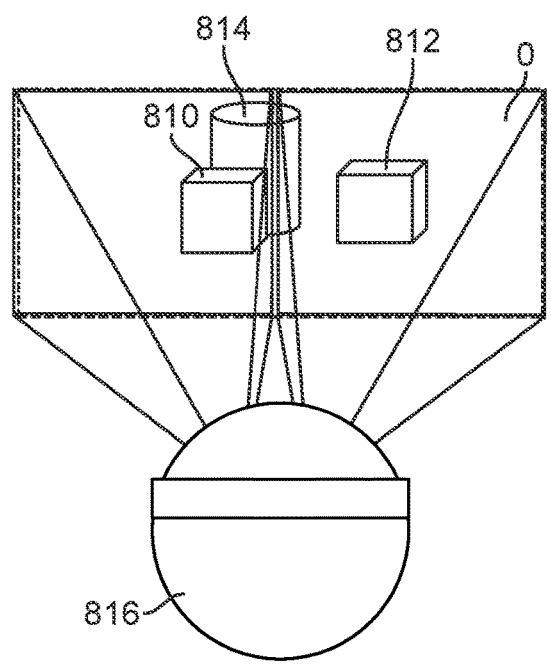

FIGS. 9A and 9B schematically depict a 3D image including a plurality of virtual objects projected onto a single depth plane for display in a discrete mode from a side perspective view (FIG. 9A) and a rear perspective view (FIG. 9B).

Figure 10A:
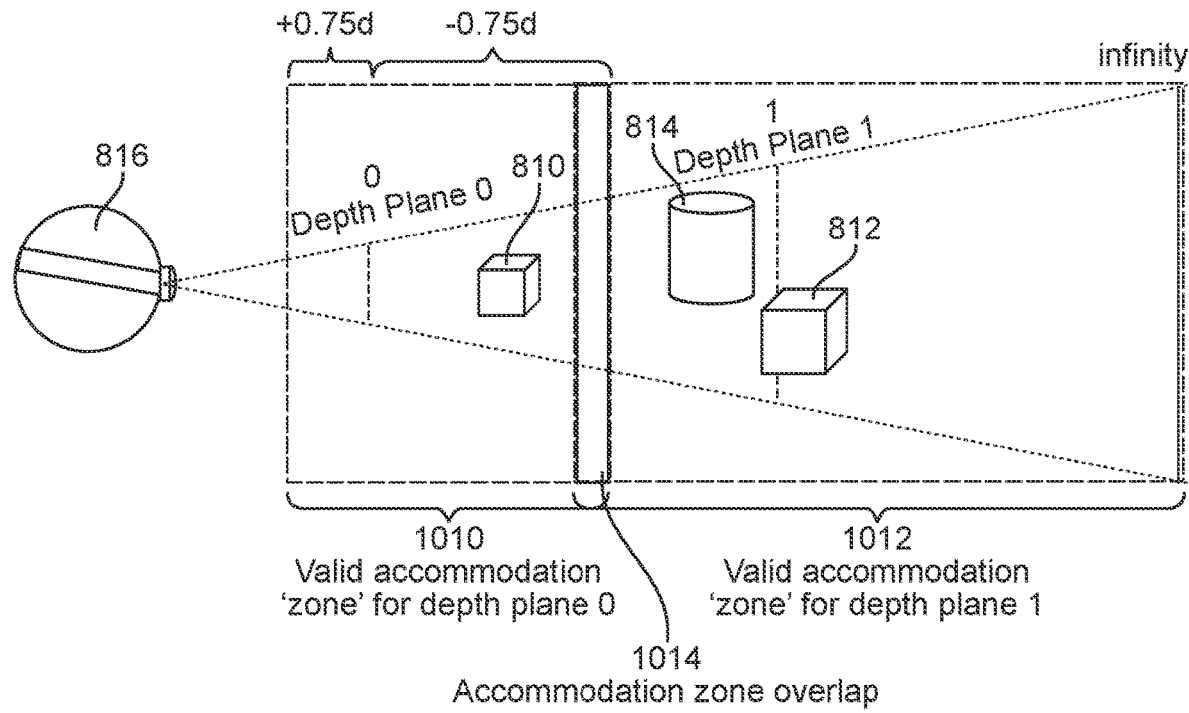

FIG. 10A schematically depicts near and far accommodation zones and an accommodation overlap zone of a dual plane blended mode display system according to some embodiments.

Figure 10B:
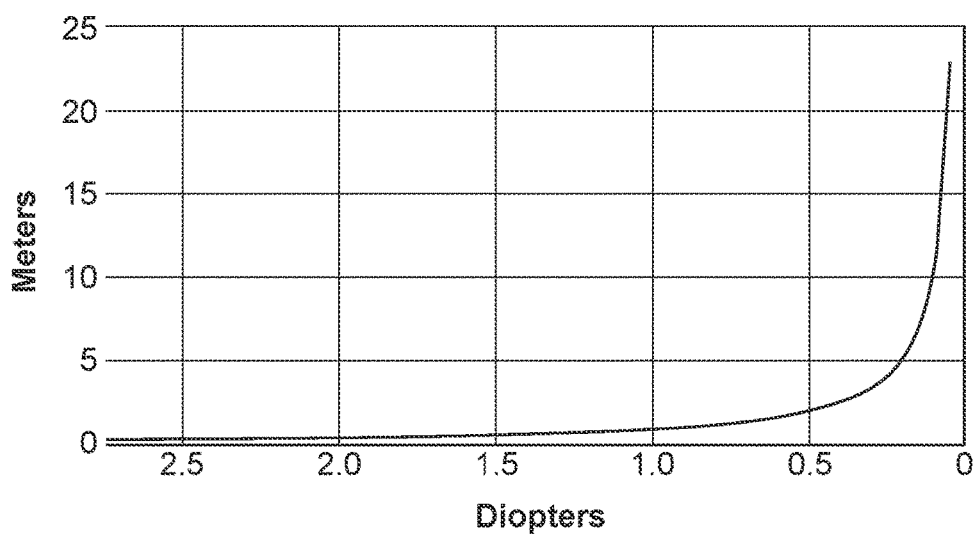

FIG. 10B schematically depicts the relationship between distance from a viewer and diopters.

Figure 11:
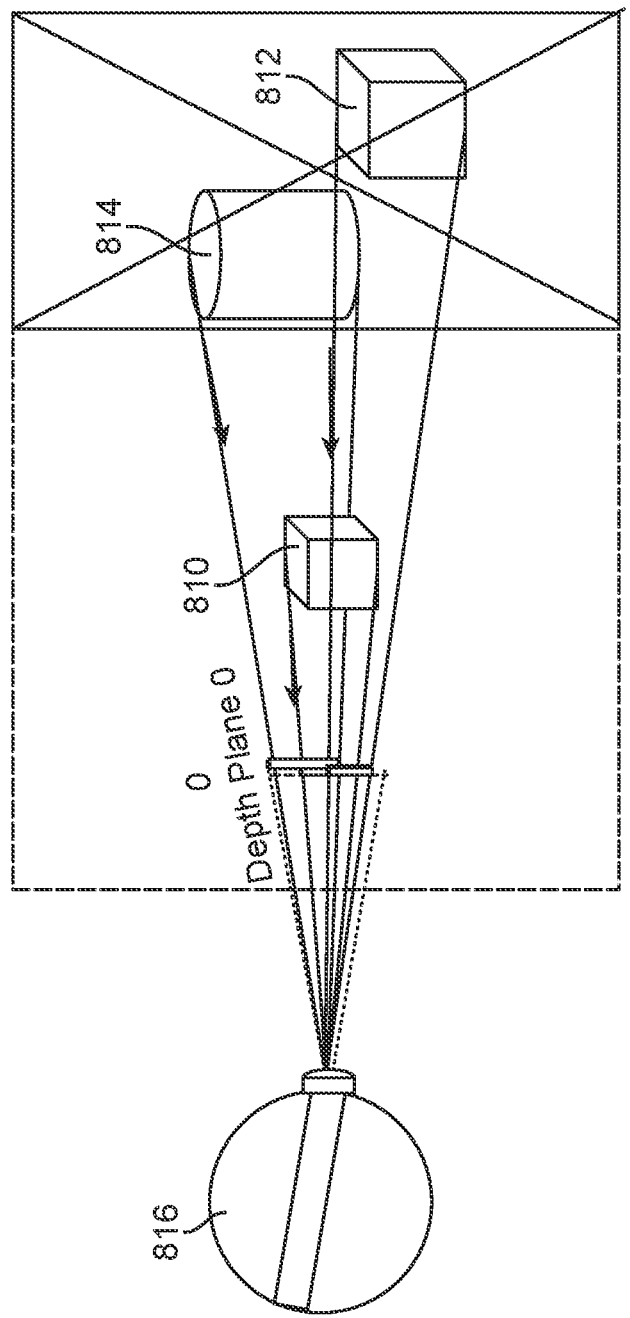

FIG. 11 schematically depicts a 3D image including a plurality of virtual objects projected onto a single depth plane for display in a discrete mode from a side perspective view.

Figure 12A:
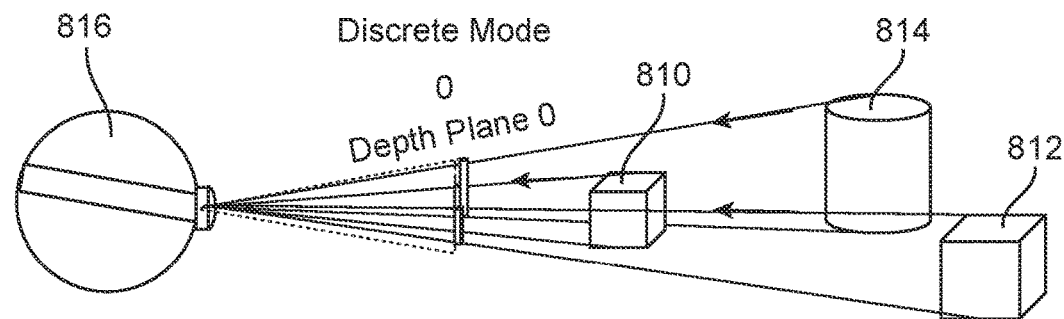

FIG. 12A schematically depicts a 3D image including a plurality of virtual objects projected onto a single depth plane for display in a discrete mode from a side perspective view.

Figure 12B:
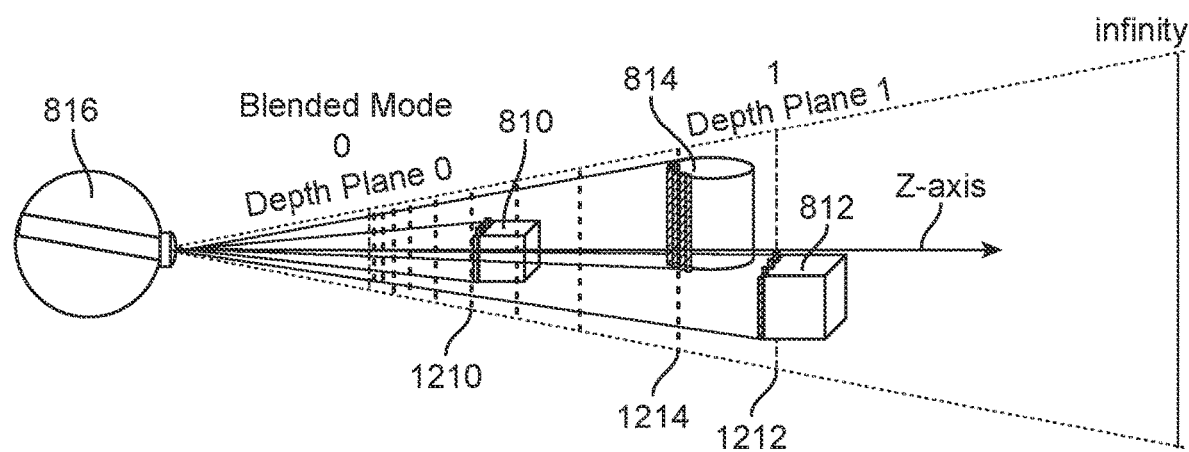

FIG. 12B schematically depicts a 3D image including a plurality of virtual objects with a plurality of virtual depth planes to be displayed in a blended mode from a side perspective view.

Figure 13:
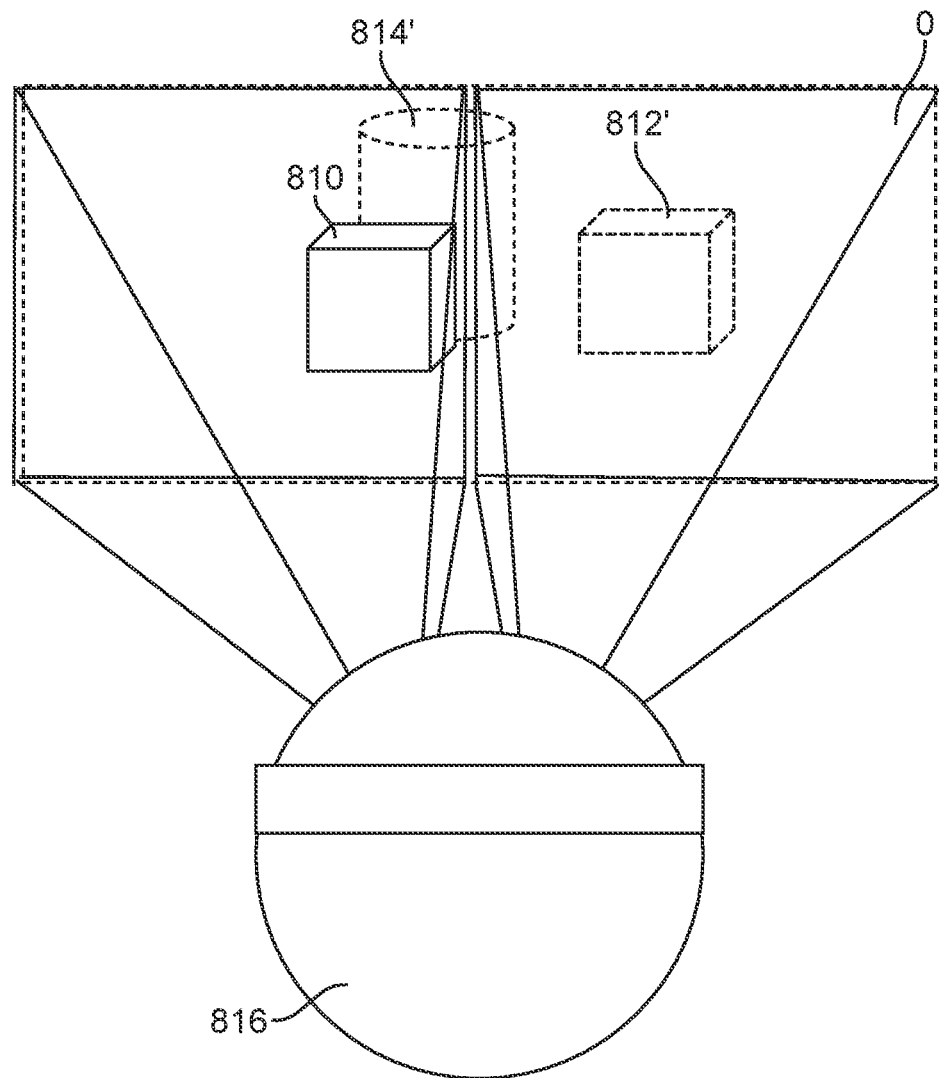

FIG. 13 schematically depicts a 3D image including a plurality of virtual objects blurred and projected onto a single depth plane for display in a discrete mode from a rear perspective view according to some embodiments.

Figure 14:
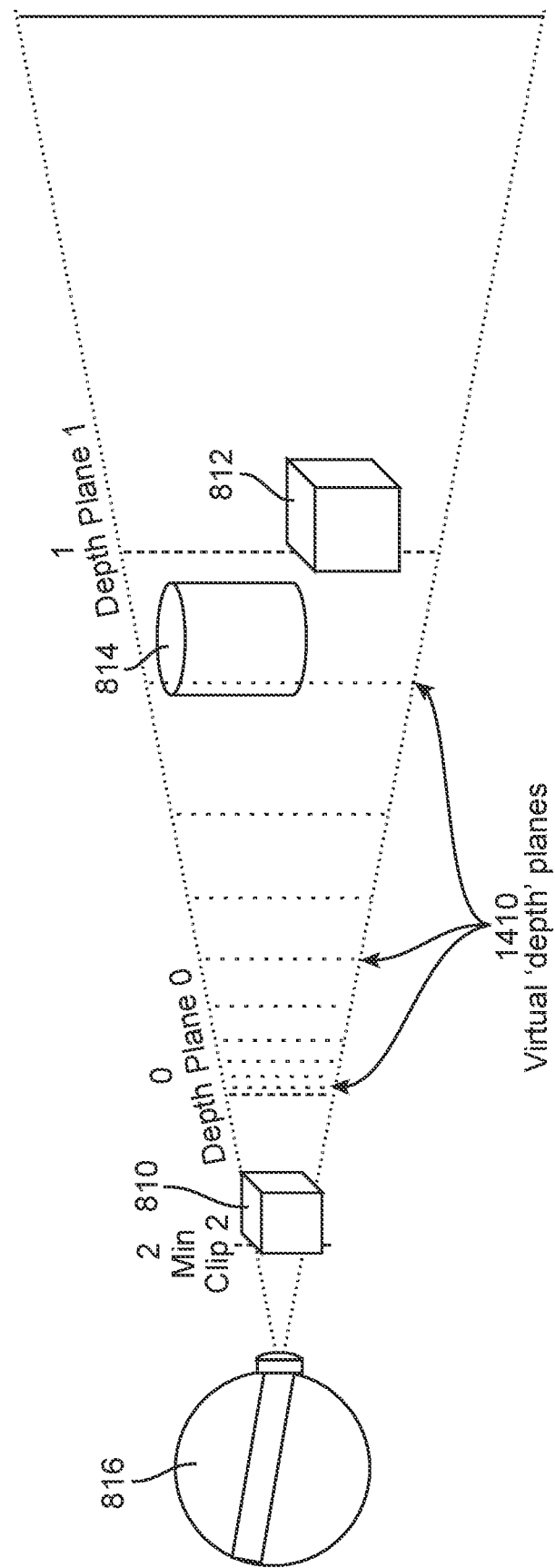

FIG. 14 schematically depicts a 3D image including a plurality of virtual objects with a plurality of virtual depth planes to be displayed in a blended mode from a side perspective view according to some embodiments.

Figure 15:
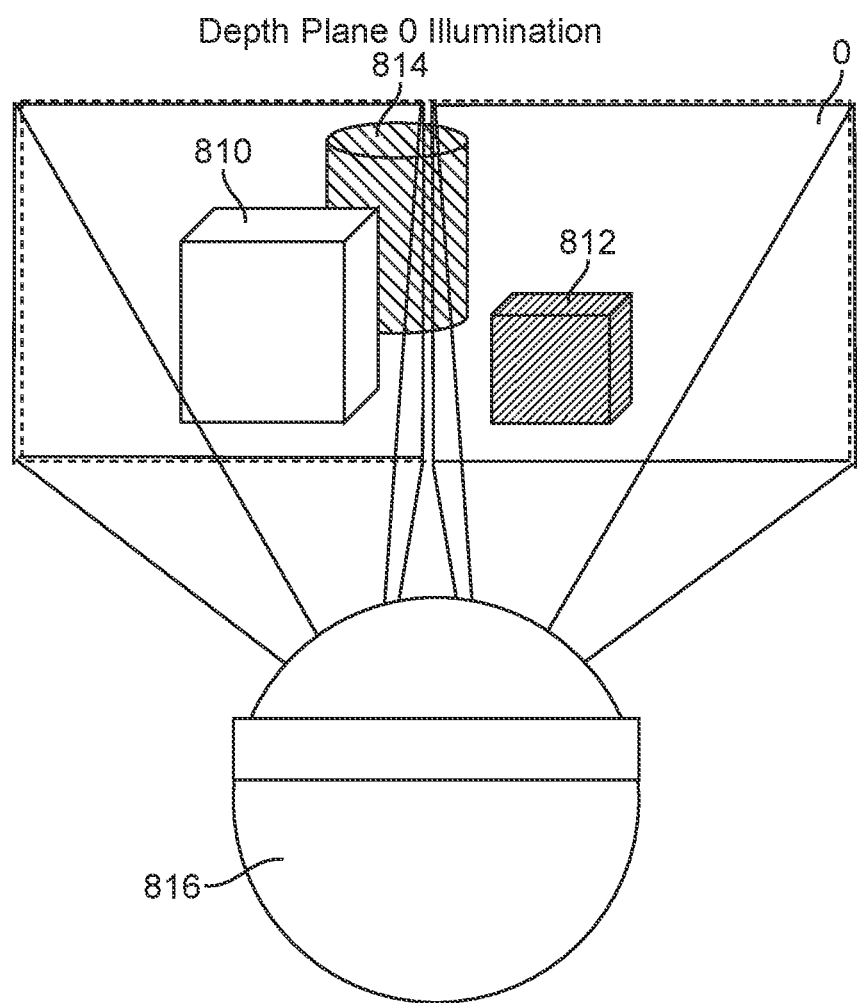

FIG. 15 schematically depicts a 3D image including a plurality of virtual objects projected onto a plane for display in a blended mode from a rear perspective view.

Figure 16:
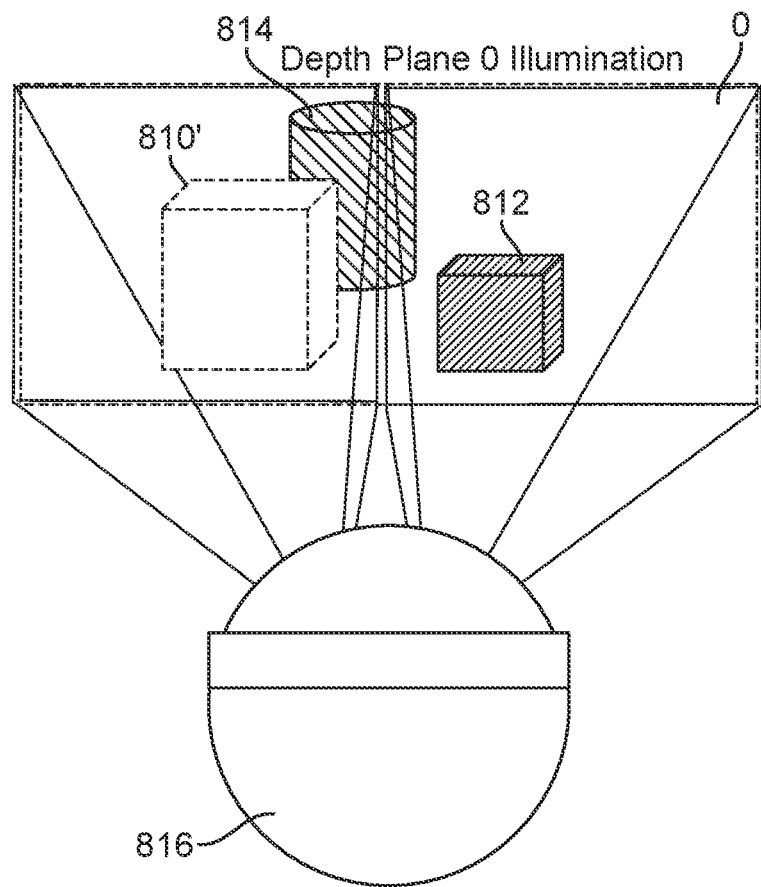

FIG. 16 schematically depicts a 3D image including a plurality of virtual objects blurred and projected onto a plane for display in a blended mode from a rear perspective view according to some embodiments.

Figure 17:
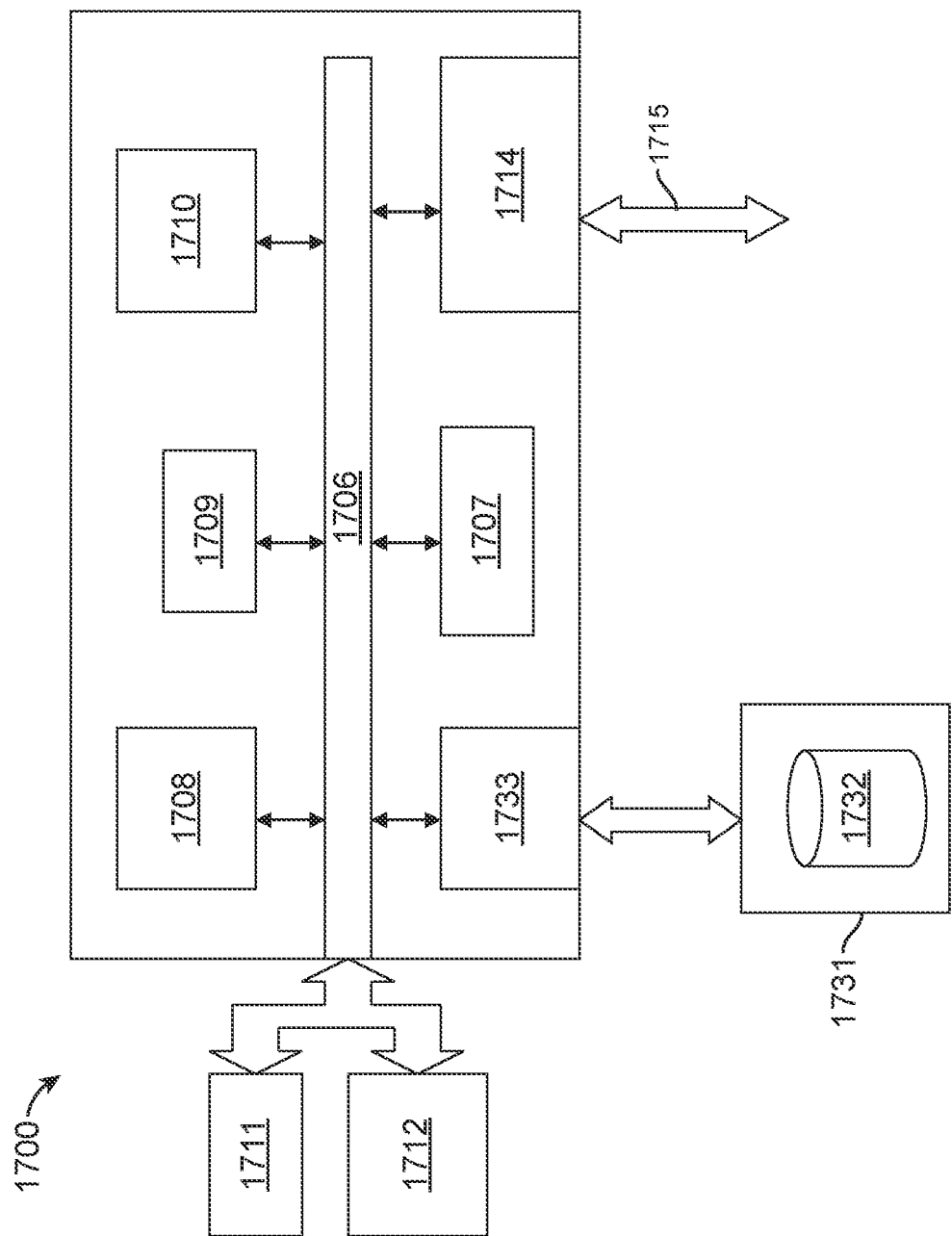

FIG. 17 is a block diagram schematically depicting an illustrative computing system according to some embodiments.

DETAILED DESCRIPTION

Various embodiments of the disclosure are directed to systems, methods, and articles of manufacture for virtual reality (VR)/augmented reality (AR)/mixed reality (MR) in a single embodiment or in multiple embodiments. Other objects, features, and advantages of the disclosure are described in the detailed description, figures, and claims.

Various embodiments will now be described in detail with reference to the drawings, which are provided as illustrative examples so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

Embodiments in accordance with the present disclosure address the problem of implementation of VR/AR/MR systems often rely on combinations of off-the-shelf-components and custom components. In some cases the off-the-shelf components do not possess all of the features or performance characteristics that are needed to implement certain desired aspects of the to-be-deployed VR/AR/MR system. Some embodiments are directed to approaches for adding capabilities and/or repurposing resources to accommodate the desired features or performance characteristics of the to-be-deployed VR/AR/MR system. The accompanying figures and discussions herein present example environments, systems, methods, and computer program products for VR/AR/MR systems.

The head mounted audio-visual display system and 3D image rendering system may be implemented independently of AR/MR systems, but some embodiments below are described in relation to AR/MR systems for illustrative purposes only. The 3D image rendering and display systems described herein may also be used in a similar manner with VR systems.

Summary of Problems and Solutions

As described above, VR/AR/MR systems have 3D image rendering and display limitations that may lead to vergence-accommodation conflict and associated degradation of the VR/AR/MR experience. In particular, the lack of accommodation-introduced blurring in discrete mode—a mode where images are rendered/displayed at one depth plane per frame—may exacerbate the vergence-accommodation conflict and the associated viewer experience degradation. Due to accommodation-introduced blurring in natural vision, real world content that is located at a different depth (i.e., diopter) than the depth at which the user is currently focused will blur naturally as a function of human perception. VR/AR/MR systems also have limitations such as size and portability, battery life, system overheating, processing power, memory, bandwidth, data sources, component latency, and other system and optical challenges, which can negatively impact VR/AR/MR system performance. These limitations may result in reducing graphical processing and image display demands becoming a countervailing challenge to improving 3D image rendering and display.

For instance, due to potential graphical processing and size/portability issues, VR/AR/MR systems, especially head worn systems, may only include sufficient components to be able to operate in discrete mode—to render and display color images at one depth plane per frame—at a minimal frame rate (e.g., 60 Hz) for smooth display of moving virtual objects (i.e., discrete mode). An example of such a VR/AR/MR system operating in discrete mode is shown in FIGS. 8A to 9B. As schematically shown in FIG. 8A, the 3D image includes three virtual objects (near and far cubes 810, 812 and one cylinder 814) adjacent various depth planes (near cube 810 adjacent near depth plane 0 and far cube 812 and cylinder 814 adjacent far depth plane 1). In some embodiments, the near depth plane 0 is at about 1.96 diopters and the far depth plane 1 is at about 0.67 diopters. FIG. 8B is a viewer's perspective view of the 3D image shown in FIG. 8A. In FIG. 8B, tracking the eyes of the viewer/user 816 indicates that the eyes of the viewer verge to a point of vergence 818 coinciding with the location of the near cube 810. In discrete mode, only a single depth plane is illuminated (i.e., image rendered and displayed) per frame. As schematically shown in FIG. 9A, because the point of vergence 818 coincides with the location of the near cube 810, which is adjacent near depth plane 0, all the content of the 3D image (i.e., near and far cubes 810, 812 and cylinder 814) are projected onto near depth plane 0. FIG. 9B is a viewer's perspective view of the 3D image after its content has been projected onto near depth plane 0. Only near depth plane 0 is illuminated, and the eyes of the viewer 816 accommodate to near depth plane 0.

In some embodiments, projecting all of the content of the 3D image onto a single depth plane only triggers minimal vergence-accommodation conflict (e.g., minimal user discomfort, eyestrain, headaches). This is because there is a loose coupling of accommodation and vergence such that the human brain will tolerate up to about a 0.75 diopter mismatch between accommodation and vergence. As shown in FIG. 10A, this ±0.75 diopter tolerance translates to a near accommodation zone 1010 and a far accommodation zone 1012. Because of the inverse relationship between distance and diopters, as shown in FIG. 10B, the far accommodation zone 1012 is larger than the near accommodation zone 1010. With the near depth plane 0 and the far depth plane 1 in the embodiment depicted in FIG. 10A, the ±0.75 diopter tolerance also results in an accommodation zone overlap 1014 where object depths falling in the accommodation zone overlap 1014 may be displayed at either or both the near depth plane 0 and the far depth plane 1, for example, at different scales, with different brightness and/or color values, etc. In embodiments where all of the content of the 3D image are located in either near the accommodation zone 1010 or the far accommodation zone 1012 and the eyes of the viewer 816 verge to that depth plane, projecting all of the content of the 3-D image onto that depth plane only triggers minimal vergence-accommodation conflict.

In some embodiments, projecting all of the content of the 3D image onto a single depth plane may trigger vergence-accommodation conflict (e.g., user discomfort, eyestrain, headaches) significant enough to affect/limit the VR/AR/MR experience. For instance, in the embodiment depicted in FIG. 10A, the far cube 812 and the cylinder 814 are located in the far accommodation zone 1012 and outside of the near accommodation zone 1010. When the attention of the viewer 816 is directed to the near cube 810, as shown in FIG. 8B, the viewer 816 can still see the far cube 812 and the cylinder 814 in the field of view of the viewer 816. The far cube 812 and the cylinder 814 do not behave optically in the same manner as real world content at their respective depths, as shown in FIG. 11. The mismatch between the accommodation estimated depth (i.e., near) and the vergence estimated depth for far cube 812 and cylinder 814 (i.e., far) can result in vergence-accommodation conflict and the associated degradation of the VR/AR/MR experience (e.g., user discomfort, eyestrain, headaches).

Further, the far cube 812 and the cylinder 814 will not have natural accommodation introduced depth blur. To simplify the 3D image rendering, the near and far cubes 810, 812 and the cylinder 814 are all rendered at full sharpness at depth plane 0. As discussed above, sharpness/blurring of the 3D image content form another cue the brain uses to estimate depth. Accordingly, the mismatch between the sharpness/blurring estimated depth (i.e., near) and the vergence estimated depth for far cube 812 and cylinder 814 (i.e., far) can exacerbate vergence-accommodation conflict and the associated degradation of the VR/AR/MR experience. In the embodiment depicted in FIGS. 9A and 9B, the farther objects (i.e., far cube 812 and cylinder 814) appear in full sharpness when they are projected onto near depth plane 0. The sharpness of these far objects on the near depth plane 0 may exacerbate vergence-accommodation conflict for the viewer. The possibility of selecting an incorrect depth plane due to eye-tracking error and delays in switching depth planes can prolong the vergence-accommodation conflict for the viewer.

The embodiments described herein include 3D image rendering and display systems and methods for use with various VR/AR/MR systems. These 3D image rendering and display systems and methods rendering display 3-D images with blurring in a discrete mode to minimize vergence-accommodation conflict while reducing the system resources consumed, thereby addressing many of the above described issues.

Illustrative VR, AR, and/or MR Systems

The description that follows pertains to illustrative VR, AR, and/or MR systems with which embodiments of various 3D image rendering and display systems may be practiced.

However, it is to be understood that the embodiments also lends themselves to applications in other types of display systems (including other types of VR, AR, and/or MR systems), and therefore the embodiments are not to be limited to only the illustrative systems disclosed herein.

VR/AR/MR systems disclosed herein can include a display which presents computer-generated imagery (video/image data) to a user. In some embodiments, the display systems are wearable, which may advantageously provide a more immersive VR/AR/MR experience. Various components of VR, AR, and/or MR virtual image systems 100 are depicted in FIGS. 2 to 5. The virtual image generation system 100 includes a frame structure 102 worn by an end user 50, a display subsystem 110 carried by the frame structure 102, such that the display subsystem 110 is positioned in front of the eyes of the end user 50, and a speaker 106 carried by the frame structure 102, such that the speaker 106 is positioned adjacent the ear canal of the end user 50 (optionally, another speaker (not shown) is positioned adjacent the other ear canal of the end user 50 to provide for stereo/shapeable sound control). The display subsystem 110 is designed to present the eyes of the end user 50 with light patterns that can be comfortably perceived as augmentations to physical reality, with high-levels of image quality and three-dimensional perception, as well as being capable of presenting two-dimensional content. The display subsystem 110 presents a sequence of frames at high frequency that provides the perception of a single coherent scene.

In the illustrated embodiments, the display subsystem 110 employs "optical see-through" display through which the user can directly view light from real objects via transparent (or semi-transparent) elements. The transparent element, often referred to as a "combiner," superimposes light from the display over the user's view of the real world. To this end, the display subsystem 110 includes a partially transparent display. In some embodiments, the transparent display may be electronically controlled. In some embodiments, the transparent display may include segmented dimming to control transparency of one or more portions of the transparent display. In some embodiments, the transparent display may include global dimming to control transparency of the entirety of the transparent display. The display is positioned in the end user's 50 field of view between the eyes of the end user 50 and an ambient environment, such that direct light from the ambient environment is transmitted through the display to the eyes of the end user 50.

In the illustrated embodiments, an image projection assembly provides light to the partially transparent display, thereby combining with the direct light from the ambient environment, and being transmitted from the display to the eyes of the user 50. The projection subsystem may be an optical fiber scan-based projection device, and the display may be a waveguide-based display into which the scanned light from the projection subsystem is injected to produce, e.g., images at a single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual system (i.e., one layer is within the cone of confusion of an adjacent layer). Additionally or alternatively, picture elements (i.e., sub-images) may be blended across two or more layers to increase perceived continuity of transition between layers in the light field, even if those layers are more sparsely stacked (i.e., one layer is outside the cone of confusion of an adjacent layer). The display subsystem 110 may be monocular or binocular. While the image projection system may be capable of generating a blended mode, system limitations (e.g., power, heat, speed, etc.) may limit the image projection system to a discrete mode with a single viewing distance per frame.

The virtual image generation system 100 may also include one or more sensors (not shown) mounted to the frame structure 102 for detecting the position and movement of the head 54 of the end user 50 and/or the eye position and inter-ocular distance of the end user 50. Such sensors may include image capture devices (such as cameras), microphones, inertial measurement units, accelerometers, compasses, GPS units, radio devices, and/or gyros). Many of these sensors operate on the assumption that the frame 102 on which they are affixed is in turn substantially fixed to the user's head, eyes, and ears. The virtual image generation system 100 may also include one or more user facing cameras to track a user's eyes.

The virtual image generation system 100 may also include a user orientation detection module. The user orientation module detects the instantaneous position of the head 54 of the end user 50 (e.g., via sensors coupled to the frame 102) and may predict the position of the head 54 of the end user 50 based on position data received from the sensors. Detecting the instantaneous position of the head 54 of the end user 50 facilitates determination of the specific actual object that the end user 50 is looking at, thereby providing an indication of the specific virtual object to be generated in relation to that actual object and further providing an indication of the position in which the virtual object is to be displayed. The user orientation module may also track the eyes of the end user 50 based on the tracking data received from the sensors.

The virtual image generation system 100 may also include a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), display bridge chips, display controllers, programmable gate arrays (PGAs), for instance field PGAs (FPGAs), and/or programmable logic controllers (PLUs).

The control subsystem of virtual image generation system 100 may include a central processing unit (CPU), a graphics processing unit (GPU), one or more frame buffers, and a three-dimensional database for storing three-dimensional scene data. The CPU may control overall operation, while the GPU may render frames (i.e., translating a three-dimensional scene into a two-dimensional image) from the three-dimensional data stored in the three-dimensional database and store these frames in the frame buffers. One or more additional integrated circuits may control the reading into and/or reading out of frames from the frame buffers and operation of the image projection assembly of the display subsystem 110.

Figure 5:
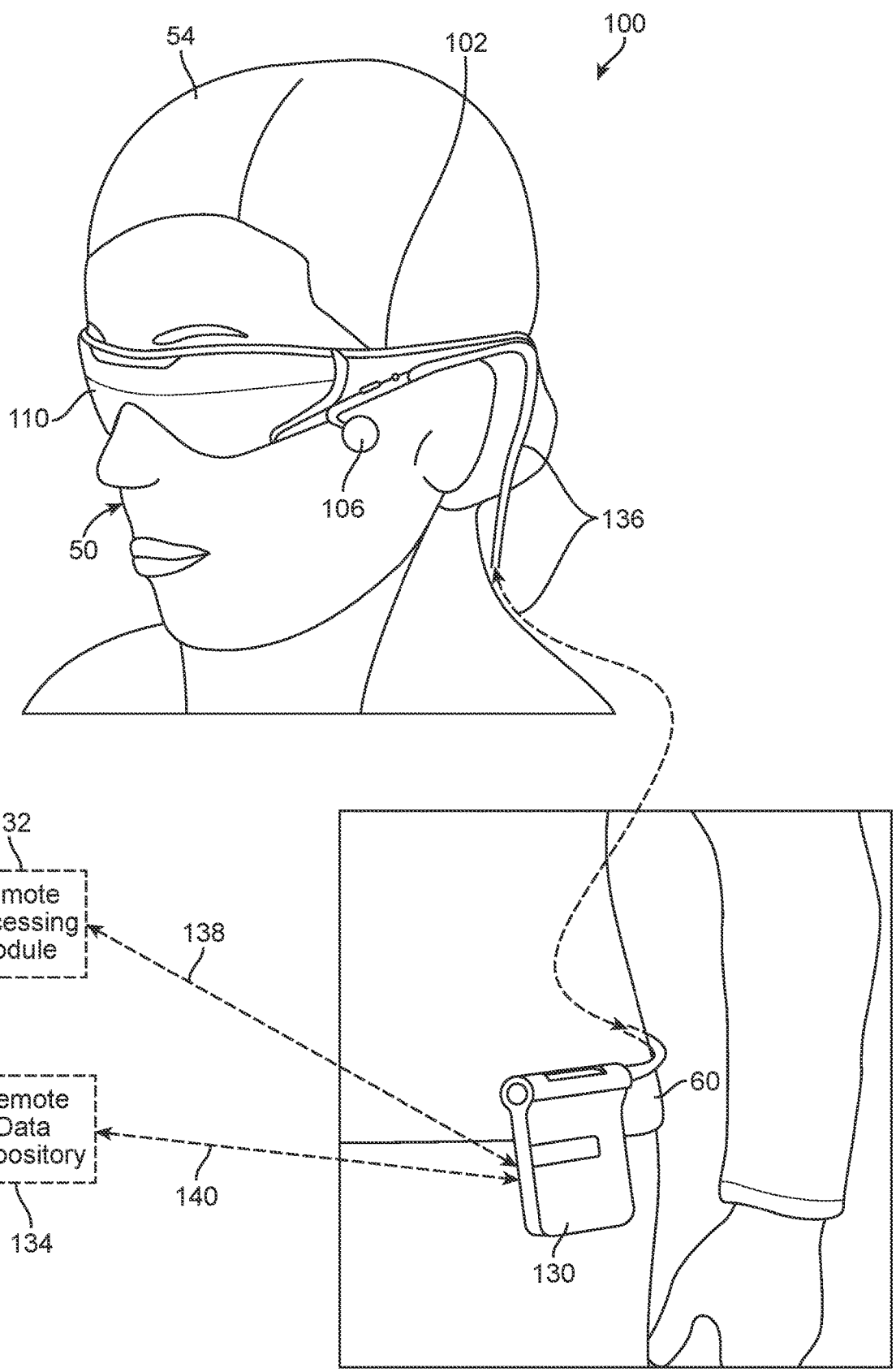

The various processing components of the virtual image generation system 100 may be physically contained in a distributed subsystem. For example, as illustrated in FIGS. 2 to 5, the virtual image generation system 100 may include a local processing and data module 130 operatively coupled, such as by a wired lead or wireless connectivity 136, to a local display bridge 142, the display subsystem 110, and sensors. The local processing and data module 130 may be mounted in a variety of configurations, such as fixedly attached to the frame structure 102 (FIG. 2), fixedly attached to a helmet or hat 56 (FIG. 3), removably attached to the torso 58 of the end user 50 (FIG. 4), or removably attached to the hip 60 of the end user 50 in a belt-coupling style configuration (FIG. 5). The virtual image generation system 100 may also include a remote processing module 132 and remote data repository 134 operatively coupled, such as by a wired lead or wireless connectivity 138, 140, to the local processing and data module 130 and the local display bridge 142, such that these remote modules 132, 134 are operatively coupled to each other and available as resources to the local processing and data module 130 and the local display bridge 142.

The local processing and data module 130 and the local display bridge 142 may each include a power-efficient processor or controller, as well as digital memory, such as flash memory, both of which may be utilized to assist in the processing, caching, and storage of data captured from the sensors and/or acquired and/or processed using the remote processing module 132 and/or remote data repository 134, possibly for passage to the display subsystem 110 after such processing or retrieval. The remote processing module 132 may include one or more relatively powerful processors or controllers configured to analyze and process data and/or image information. The remote data repository 134 may include a relatively large-scale digital data storage facility, which may be available through the internet or other networking configuration in a "cloud" resource configuration. In some embodiments, all data is stored and all computation is performed in the local processing and data module 130 and the local display bridge 142, allowing fully autonomous use from any remote modules.

The couplings 136, 138, 140 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless. In still further implementations, the choice of wired and wireless communications may be different from that illustrated in FIGS. 2 to 5. Thus, the particular choice of wired or wireless communications should not be considered limiting.

In some embodiments, the user orientation module is contained in the local processing and data module 130 and/or the local display bridge 142, while CPU and GPU are contained in the remote processing module. In alternative embodiments, the CPU, GPU, or portions thereof may be contained in the local processing and data module 130 and/or the local display bridge 142. The 3D database can be associated with the remote data repository 134 or disposed locally.

Some VR, AR, and/or MR systems use a plurality of volume phase holograms, surface-relief holograms, or light guiding optical elements that are embedded with depth plane information to generate images that appear to originate from respective depth planes. In other words, a diffraction pattern, or diffractive optical element (DOE) may be embedded within or imprinted/embossed upon a light guiding optical element (LOE; e.g., a planar waveguide) such that as collimated light (light beams with substantially planar wavefronts) is substantially totally internally reflected along the LOE, it intersects the diffraction pattern at multiple locations and exits toward the user's eye. The DOEs are configured so that light exiting therethrough from an LOE are verged so that they appear to originate from a particular depth plane. The collimated light may be generated using an optical condensing lens (a "condenser").

For example, a first LOE may be configured to deliver collimated light to the eye that appears to originate from the optical infinity depth plane (0 diopters). Another LOE may be configured to deliver collimated light that appears to originate from a distance of 2 meters (½ diopter). Yet another LOE may be configured to deliver collimated light that appears to originate from a distance of 1 meter (1 diopter). By using a stacked LOE assembly, it can be appreciated that multiple depth planes may be created, with each LOE configured to display images that appear to originate from a particular depth plane. It should be appreciated that the stack may include any number of LOEs. However, at least N stacked LOEs are required to generate N depth planes. Further, N, 2N or 3N stacked LOEs may be used to generate RGB colored images at N depth planes.

In order to present 3D virtual content to the user, the VR, AR, and/or MR system projects images of the virtual content into the user's eye so that they appear to originate from various depth planes in the Z direction (i.e., orthogonally away from the user's eye) in either a blended or a discrete mode. In other words, the virtual content may not only change in the X and Y directions (i.e., in a 2D plane orthogonal to a central visual axis of the user's eye), but it may also appear to change in the Z direction such that the user may perceive an object to be very close or at an infinite distance or any distance in between. In other embodiments, the user may perceive multiple objects simultaneously at different depth planes. For example, the user may simultaneously see a virtual bird at a distance of 3 meters away from the user and a virtual coffee cup at arm's length (about 1 meter) from the user. Alternatively, the user may see a virtual dragon appear from infinity and run towards the user.

Multiple-plane focus systems create a perception of variable depth by projecting images on some or all of a plurality of depth planes located at respective fixed distances in the Z direction from the user's eye in either a blended or discrete mode. Referring now to FIG. 6, it should be appreciated that multiple-plane focus systems may display frames at fixed depth planes 150 (e.g., the six depth planes 150 shown in FIG. 6). Although MR systems can include any number of depth planes 150, one exemplary multiple-plane focus system has six fixed depth planes 150 in the Z direction. In generating virtual content one or more of the six depth planes 150, 3D perception is created such that the user perceives one or more virtual objects at varying distances from the user's eye. Given that the human eye is more sensitive to objects that are closer in distance than objects that appear to be far away, more depth planes 150 are generated closer to the eye, as shown in FIG. 6. In other embodiments, the depth planes 150 may be placed at equal distances away from each other.

Depth plane positions 150 may be measured in diopters, which is a unit of optical power equal to the inverse of the focal length measured in meters. For example, in some embodiments, depth plane DP1 may be ⅓ diopters away, depth plane DP2 may be 0.3 diopters away, depth plane DP3 may be 0.2 diopters away, depth plane DP4 may be 0.15 diopters away, depth plane DP5 may be 0.1 diopters away, and depth plane DP6 may represent infinity (i.e., 0 diopters away). It should be appreciated that other embodiments may generate depth planes 150 at other distances/diopters. Thus, in generating virtual content at strategically placed depth planes 150, the user is able to perceive virtual objects in three dimensions. For example, the user may perceive a first virtual object as being close to him when displayed in depth plane DP1, while another virtual object appears at infinity at depth plane DP6. Alternatively, the virtual object may first be displayed at depth plane DP6, then depth plane DP5, and so on until the virtual object appears very close to the user. It should be appreciated that the above examples are significantly simplified for illustrative purposes. In another embodiment, all six depth planes may be concentrated on a particular focal distance away from the user. For example, if the virtual content to be displayed is a coffee cup half a meter away from the user, all six depth planes could be generated at various cross-sections of the coffee cup, giving the user a highly granulated 3D view of the coffee cup.

In some embodiments, the VR, AR, and/or MR system may work as a multiple-plane focus system. In other words, all six LOEs may be illuminated almost simultaneously, such that images appearing to originate from six fixed depth planes are generated in rapid succession with the light sources rapidly conveying image information to LOE 1, then LOE 2, then LOE 3 and so on. For example, a portion of the desired image, comprising an image of the sky at optical infinity may be injected at time 1 and the LOE retaining collimation of light (e.g., depth plane DP6 from FIG. 6) may be utilized. Then an image of a closer tree branch may be injected at time 2 and an LOE configured to create an image appearing to originate from a depth plane 10 meters away (e.g., depth plane DP5 from FIG. 6) may be utilized; then an image of a pen may be injected at time 3 and an LOE configured to create an image appearing to originate from a depth plane 1 meter away may be utilized. This type of paradigm can be repeated in rapid time sequential fashion such that the user's eye and brain (e.g., visual cortex) perceives the input to be all part of the same image.

In blended mode, such multiple plane focus systems have system requirements in terms of display and processor speed, which may not be achievable in portable VR, AR, and/or MR systems. In discrete mode, such multiple plane focus systems may project all 3D image content, regardless of optical depth to a single depth plane corresponding to the viewer's point of focus to prevent the out of plane content from flickering due to system speed limitations.

VR, AR, and/or MR systems may project images (i.e., by diverging or converging light beams) that appear to originate from various locations along the Z axis (i.e., depth planes) to generate images for a 3D experience/scenario. As used in this application, light beams include, but are not limited to, directional projections of light energy (including visible and invisible light energy) radiating from a light source. Generating images that appear to originate from various depth planes conforms the vergence and accommodation of the user's eye for that image, and minimizes or eliminates vergence-accommodation conflict.

Referring now to FIG. 7, an exemplary embodiment of an AR or MR system 700 (hereinafter referred to as "system 700") is illustrated. The system 700 uses stacked light guiding optical element (hereinafter referred to as "LOEs 790"). The system 700 generally includes one or more image generating processors 710, one or more light sources 720, one or more controller/display bridges (DB) 730, one or more spatial light modulators (SLM) 740, and one or more sets of stacked LOEs 790 that function as a multiple plane focus system. The system 700 may also include an eye-tracking subsystem 750.

The image generating processor 710 is configured to generate virtual content to be displayed to the user. The image generating processor 710 may convert an image or video associated with the virtual content to a format that can be projected to the user in 3D. For example, in generating 3D content, the virtual content may need to be formatted such that portions of a particular image are displayed at a particular depth plane while others are displayed at other depth planes. In one embodiment, all of the image may be generated at a particular depth plane. In another embodiment, the image generating processor 710 may be programmed to provide slightly different images to the right and left eyes such that when viewed together, the virtual content appears coherent and comfortable to the user's eyes. The image generating processor 710 may also be configured to blur portions of the image or video.

The image generating processor 710 may further include a memory 712, a GPU 714, a CPU 716, and other circuitry for image generation and processing. The image generating processor 710 may be programmed with the desired virtual content to be presented to the user of the system 700. It should be appreciated that in some embodiments, the image generating processor 710 may be housed in the system 700. In other embodiments, the image generating processor 710 and other circuitry may be housed in a belt pack that is coupled to the system 700. In some embodiments, the image generating processor 710, or one or more components thereof, may be a part of a local processing and data module (e.g., local processing and data module 130). As mentioned above, the local processing and data module 130 may be mounted in a variety of configurations, such as fixedly attached to the frame structure 102 (FIG. 2), fixedly attached to a helmet or hat 56 (FIG. 3), removably attached to the torso 58 of the end user 50 (FIG. 4), or removably attached to the hip 60 of the end user 50 in a belt-coupling style configuration (FIG. 5).

The image generating processor 710 is operatively coupled to the light source 720 which projects light associated with the desired virtual content and one or more spatial light modulators 740. The light source 720 is compact and has high resolution. The light source 720 is operatively coupled to a controller/DB 730. The light source 720 may be include color specific LEDs and lasers disposed in various geometric configurations. Alternatively, the light source 720 may include LEDs or lasers of like color, each one linked to a specific region of the field of view of the display. In another embodiment, the light source 720 may include a broad-area emitter such as an incandescent or fluorescent lamp with a mask overlay for segmentation of emission areas and positions. Although the light source 720 is directly connected to the system 700 in FIG. 2B, the light source 720 may be connected to the system 700 via optical fibers (not shown). The system 700 may also include condenser (not shown) configured to collimate the light from the light source 720.

The SLM 740 may be reflective (e.g., an LCOS, an FLCOS, a DLP DMD, or a MEMS mirror system), transmissive (e.g., an LCD) or emissive (e.g. an FSD or an OLED) in various exemplary embodiments. The type of SLM 740 (e.g., speed, size, etc.) can be selected to improve the creation of the 3D perception. While DLP DMDs operating at higher refresh rates may be easily incorporated into stationary systems 700, wearable systems 700 may use DLPs of smaller size and power. The power of the DLP changes how 3D depth planes/focal planes are created. The image generating processor 710 is operatively coupled to the SLM 740, which encodes the light from the light source 720 with the desired virtual content. Light from the light source 720 may be encoded with the image information when it reflects off of, emits from, or passes through the SLM 740.

Light from the SLM 740 is directed to the LOEs 790 such that light beams encoded with image data for one depth plane and/or color by the SLM 740 are effectively propagated along a single LOE 790 for delivery to an eye of a user. Each LOE 790 is configured to project an image or sub-image that appears to originate from a desired depth plane or FOV angular position onto a user's retina. The light source 720 and LOEs 790 can therefore selectively project images (synchronously encoded by the SLM 740 under the control of controller/DB 730) that appear to originate from various depth planes or positions in space. By sequentially projecting images using each of the light source 720 and LOEs 790 at a sufficiently high frame rate (e.g., 360 Hz for six depth planes at an effective full-volume frame rate of 60 Hz), the system 700 can generate a 3D image of virtual objects at various depth planes that appear to exist simultaneously in the 3D image.

The controller/DB 730 is in communication with and operatively coupled to the image generating processor 710, the light source 720 and the SLM 740 to coordinate the synchronous display of images by instructing the SLM 740 to encode the light beams from the light source 720 with appropriate image information from the image generating processor 710. While the system includes an image generating processor 710, the controller/DB 730, in some embodiments, may also perform at least some image generating processes including, for example, the processes of the memory 712, the GPU 714, and/or the CPU 716. In some embodiments, the controller/DB 730 may include one or more components shown in the image generating processor 710, such as, for example, the memory 712, the GPU 714, and/or the CPU 716.

The system 700 may also include an eye-tracking subsystem 750 that is configured to track the user's eyes to determine the user's point of vergence/point of focus. In one embodiment, the system 700 is configured to illuminate a subset of LOEs 790 in discrete mode, based on input from the eye-tracking subsystem 750 such that the image is generated at a desired depth plane that coincides with the user's point of vergence as shown in FIGS. 9A and 9B. For example, if the user's eyes are parallel to each other, the system 700 may illuminate the LOE 790 that is configured to deliver collimated light to the user's eyes, such that the image appears to originate from optical infinity. In another example, if the eye-tracking subsystem 750 determines that the user's point of vergence is at 1 meter away, the LOE 790 that is configured to focus approximately within that range may be illuminated instead. In embodiments where depth planes approximating the entire depth range are simultaneously (or almost simultaneously) illuminated in blended mode, the eye-tracking subsystem 750 is not required to determine the user's point of vergence in order to choose one or more depth planes to illuminate.

Illustrative Discrete Mode Rendering and Display with Blurring

FIG. 12A depicts a discrete mode display where the near and far cubes 810, 812 and the cylinder 814 are projected onto the near depth plane 0 in response to tracking the point of vergence of the viewer 816 to the near cube 810, which is adjacent the near depth plane 0. Projection to the near depth plane 0 results in viewer accommodation to the near depth plane 0 even for the far cubes 812 and the cylinder 814, which are closer to the far depth plane 1 than the near depth plane 0.

Referring to the discrete mode display shown in FIGS. 9A and 9B, the far cube 812 and the cylinder 814 are rendered in full sharpness even though they are closer to the far depth plane 1 than the near depth plane 0. As explained above, this sharpness of out of illuminated plane objects results in an accommodation cue that may exacerbate vergence-accommodation conflict.

FIG. 13 depicts a discrete mode display with blurring, according to some embodiments. Like the discrete mode display shown in FIG. 9B, the discrete mode display shown in FIG. 13 has projected the near and far cubes 810, 812 and the cylinder 814 (see FIG. 9A) onto the near depth plane 0 in response to tracking the point of vergence of the viewer 816 to the near cube 810, which is adjacent the near depth plane 0. Unlike the discrete mode display shown in FIG. 9B, the discrete mode display shown in FIG. 13 has also blurred the far cube 812' and cylinder 814' to provide a more natural accommodation cue for these out of illuminated plane objects.

The display system can analyze the 3D image data shown in FIGS. 8A and 8B to generate best known depth data for the virtual objects therein. The display system may generate best known depth data using disparity maps in the 3D image data and/or data sets in a depth buffer. The display system can then analyze the best known depth data to identify one or more objects to be blurred to generate one or more blurred objects. The one or more blurred objects along with one or more non-blurred objects are then projected onto a depth plane corresponding to the point of vergence/focus of the viewer. The projected image is a partially blurred 2D image including out of illumination plane blurred objects and in illumination plane sharp objects.

The display system can also determine an intensity of blurring based on the best known depth of an object to be blurred and the depth of the point of vergence/focus of the viewer. For example, the intensity of blurring of an object may be related to a difference/distance between its best known depth (e.g., an average of the best known depths of all the pixels in the object) and the depth of the point of vergence/focus of the viewer. The relationship between the blurring and the difference/distance may be linear, logarithmic, asymmetric, etc. Blurring each out of illuminated plane object to different degrees based on its distance from a point of vergence/focus of the viewer provides even more natural accommodation cues for these objects. In some embodiments, all out of illuminated plane objects may be blurred to a same degree. In these embodiments, the intensity of blurring may be based on an average of the best known depths of all pixels in all out of illuminated plane objects.

The above embodiments include a variety of different methods for blurring out of illuminated plane objects to provide more natural accommodation cues for those objects. This blurring allows a display system to project objects in a discrete display mode with more natural accommodation cues, thereby reducing demands on the display system. Such reduced demands include display and processor speed, power, and heat generation. Further, the blurred object identification and blur intensity determination steps described above are more efficient than other blurring techniques and improves processor performance in terms of speed, power, and heat generation.

Illustrative Blended Mode Rendering and Display with Blurring

FIG. 12B depicts a blended mode synthetic light field, according to some embodiments. In the blended display mode, the near and far cubes 810, 812 and the cylinder 814 are "virtually projected" onto respective virtual depth planes 1210, 1212, 1214 adjacent the respective location of the near and far cubes 810, 812 and the cylinder 814 along an optical axis ("Z axis") of the system. The near and far cubes 810, 812 and the cylinder 814 are only virtually projected because only the near and far depth planes 0, 1 are actually illuminated. As described above, virtual projection onto virtual depth planes 1210, 1212, 1214 are simulated through scaler blending of the sub-images projected onto the near and far depth planes 0, 1. The rendering of 2D images to be projected at each of the virtual depth planes 1210, 1212, 1214, including blending of objects therein, as described in U.S. Provisional Patent Application Ser. No. 62/851,773, the contents of which have been incorporated by reference herein.

FIG. 14 depicts a "blended mode" of rendering and displaying 3D images, according to some embodiments. A blended mode display presents a synthetic light field generated from a combination of at least two discrete depth planes 0, 1. Due to a tolerance between accommodation and vergence (e.g., ±0.75 diopter), by configuring the rendering and display system to position a near depth plane 0 and a far depth plane 1 within a predetermined number of diopters of each other (e.g., 1.5 diopters), these two depth planes 0, 1 can cover an entire 3D field of view from approximately a cut-off minimum distance of a viewer's vision to approximately infinity, as shown in FIG. 10A. The blended mode synthetic light field simulates a viewer's accommodation to any position between the two depth planes 0, 1 as a scaler blend of sub-images as projected onto the two depth planes 0, 1. Through scaler blending of sub-images at the two depth planes 0, 1, the blended mode synthetic light field can simulate accommodation to one or more virtual depth planes 1410. Blended mode increases the fidelity of viewer accommodation resulting in a more natural depth perception.

In the embodiment depicted in FIG. 14, the near cube 810 is proximate a minimum clipping distance 2 of the display system, i.e. the distance at which an object is no longer visible to a viewer using a display system. In some embodiments, the min clip 2 may be about 37 cm or 2.7 dpt. FIG. 15 depicts an image generated by a blended mode display system at a near plane 0, according to some embodiments. Even though the near cube 810 is adjacent the min clip 2, the embodiment in FIG. 15 renders the near cube 810 in full sharpness. The sharpness of the near cube 810 contrasts with the blurriness of real-world objects near the min clip 2 of the system resulting in an erroneous accommodation cue. Accordingly, this erroneous accommodation cue can exacerbate vergence-accommodation conflict in a user of the system viewing the image in FIG. 15. The embodiment in FIG. 16, on the other hand, has blurred the near cube 810', thereby providing a more natural accommodation cue for an object near the min clip 2 of a display system. Similar type of blurring can be applied to objects near the far clip (i.e., infinity). In some embodiments, the far clip can be about 87 cm or 1.15 dpt.

The display system can analyze the 3D image data shown in FIG. 14 to generate best known depth data for the virtual objects therein. The display system may generate best known depth data using disparity maps in the 3D image data and/or data sets in a depth buffer. The display system can then analyze the best known depth data to identify the object or objects adjacent the min or far clips to be blurred to generate blurred objects. The blurred objects are then projected onto respective depth planes corresponding to the location of the objects in the 3D image to be displayed in blended mode. The projected image may be a fully blurred 2D image or a partially blurred 2D image including near clip blurred objects and other objects.

The display system can also determine an intensity of blurring based on the best known depth of an object to be blurred and the depth of the min clip or far clip. For example, the intensity of blurring of an object may be related to a difference/distance between its best known depth (e.g., an average of the best known depths of all the pixels in the object) and the min clip or far clip. The relationship between the blurring and the difference/distance may be linear, logarithmic, asymmetric, etc. Blurring each near clip object to different degrees based on its distance from the min clip or far clip provides even more natural accommodation cues for these objects. Alternatively, all near clip objects may be blurred to a same degree. Near clip objects may be blurred/faded out until they were portions thereof reach the clip or far clip, at which point the objects may be completely removed. For instance, an object located at the far clip may be completely removed unless the viewer is verging to that object. In other embodiments, virtual objects may appear a short distance beyond the min clip and/or the far clip.

While the techniques for blurring near clip objects have been described relative to a blended mode display, such techniques are equally applicable to discrete mode displays, because discrete mode displays may also project 3D images including near clip objects.

The above embodiments include a variety of different methods for blurring near clip objects to provide more natural accommodation cues for those objects. This blurring allows a display system to project objects in a blended or discrete display mode with more natural accommodation cues, thereby reducing demands on the display system. Such reduced demands include display and processor speed, power, and heat generation. Further, the blurred object identification and blur intensity determination steps described above are more efficient than other blurring techniques and improves processor performance in terms of speed, power, and heat generation.

System Architecture Overview

FIG. 17 is a block diagram of an illustrative computing system 1700 suitable for implementing an embodiment of the present disclosure. Computer system 1700 includes a bus 1706 or other communication mechanism for communicating information, which interconnects subsystems and devices, such as processor 1707, system memory 1708 (e.g., RAM), static storage device 1709 (e.g., ROM), disk drive 1710 (e.g., magnetic or optical), communication interface 1714 (e.g., modem or Ethernet card), display 1711 (e.g., CRT or LCD), input device 1712 (e.g., keyboard), and cursor control.

According to one embodiment of the disclosure, computer system 1700 performs specific operations by processor 1707 executing one or more sequences of one or more instructions contained in system memory 1708. Such instructions may be read into system memory 1708 from another computer readable/usable medium, such as static storage device 1709 or disk drive 1710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 1707 for execution. Such a medium may take many forms, including but not limited to, non-volatile media and volatile media. Non-volatile media includes, for example, optical or magnetic disks, such as disk drive 1710. Volatile media includes dynamic memory, such as system memory 1708.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM (e.g., NAND flash, NOR flash), any other memory chip or cartridge, or any other medium from which a computer can read.

In an embodiment of the disclosure, execution of the sequences of instructions to practice the disclosure is performed by a single computer system 1700. According to other embodiments of the disclosure, two or more computer systems 1700 coupled by communication link 1715 (e.g., LAN, PTSN, or wireless network) may perform the sequence of instructions required to practice the disclosure in coordination with one another.

Computer system 1700 may transmit and receive messages, data, and instructions, including program, i.e., application code, through communication link 1715 and communication interface 1714. Received program code may be executed by processor 1707 as it is received, and/or stored in disk drive 1710, or other non-volatile storage for later execution. Database 1732 in storage medium 1731 may be used to store data accessible by system 1700 via data interface 1733.

While the blended mode embodiments described above include two depth planes (e.g., near and far depth planes), other embodiments may include more than two depth planes. Increasing the number of depth planes increases the fidelity with which virtual depth planes are simulated. However, this increase in fidelity is offset by an increase in hardware and processing demands, which can exceed the resources available in current portable 3D rendering and display systems.

Certain aspects, advantages and features of the disclosure have been described herein. It is to be understood that not necessarily all such advantages may be achieved in accordance with any particular embodiment of the disclosure. Thus, the disclosure may be embodied or carried out in a manner that achieves or optimizes one advantage or group of advantages as taught herein without necessarily achieving other advantages as may be taught or suggested herein.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, methods, and the like described herein. A wide variety of variation is possible. Components, elements, and/or steps may be altered, added, removed, or rearranged.

The devices and methods described herein can advantageously be at least partially implemented using, for example, computer software, hardware, firmware, or any combination of software, hardware, and firmware. Software modules can include computer executable code, stored in a computer's memory, for performing the functions described herein. In some embodiments, computer-executable code is executed by one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers. In addition, where methods are described that are, or could be, at least in part carried out by computer software, it should be understood that such methods can be provided on non-transitory computer-readable media that, when read by a computer or other processing device, cause it to carry out the method.

While certain embodiments have been explicitly described, other embodiments will become apparent to those of ordinary skill in the art based on this disclosure.

The various processors and other electronic components described herein are suitable for use with any optical system for projecting light. The various processors and other electronic components described herein are also suitable for use with any audio system for receiving voice commands.

Various exemplary embodiments of the disclosure are described herein. Reference is made to these examples in a non-limiting sense. They are provided to illustrate more broadly applicable aspects of the disclosure. Various changes may be made to the disclosure described and equivalents may be substituted without departing from the true spirit and scope of the disclosure. In addition, many modifications may be made to adapt a particular situation, material, composition of matter, process, process act(s) or step(s) to the objective(s), spirit or scope of the present disclosure. Further, as will be appreciated by those with skill in the art, each of the individual variations described and illustrated herein has discrete components and features which may be readily separated from or combined with the features of any of the other several embodiments without departing from the scope or spirit of the present disclosure. All such modifications are intended to be within the scope of claims associated with this disclosure.

The disclosure includes methods that may be performed using the subject devices. The methods may include the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity)

may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

The invention claimed is:

1. A method for displaying a three dimensional ("3D") image to a user, comprising:
rendering a frame of 3D image data;
analyzing the frame of 3D image data to generate depth data;
identifying a set of virtual objects/pixels having respective depths in a range that includes one of a near clip and a far clip;
blurring the set of virtual objects/pixels when the user is focused on the set of virtual objects/pixels, thereby generating a blurred set of virtual objects/pixels; and
displaying the blurred set of virtual objects/pixels to the user.

2. The method of claim 1, further comprising projecting the frame of 3D image data to generate a two dimensional ("2D") image frame,
wherein blurring the set of virtual objects/pixels comprises blurring portions of the 2D image frame corresponding to the set of virtual objects/pixels to generate a partially blurred 2D image frame, and
wherein displaying the blurred set of virtual objects/pixels to the user comprises displaying the partially blurred 2D image frame to the user.

3. The method of claim 1, further comprising combining a second set of virtual objects/pixels and the blurred set of virtual objects/pixels to generate a partially blurred two dimensional ("2D") image frame, wherein displaying the blurred set of virtual objects/pixels to the user comprises displaying the partially blurred 2D image frame to the user.

4. The method of claim 1, further comprising blurring the set of virtual objects/pixels based on respective depths to generate the blurred set of virtual objects/pixels.

5. The method of claim 4, further comprising blurring each of the set of virtual objects/pixels to the same degree.

6. The method of claim 4, further comprising variably blurring each of the set of virtual objects/pixels,
wherein respective degrees of blurring of the each of the set of virtual objects/pixels are proportional to the respective depths.

7. The method of claim 4, wherein the degrees of blurring are directly proportional to the respective depths.

8. The method of claim 4, wherein the degrees of blurring are one of linearly proportional, logarithmically proportional, and asymmetrically proportional to the respective depths.

9. The method of claim 1, wherein the depth range includes the far clip.

10. The method of claim 9, wherein the far clip corresponds to about 1.15 diopters.

11. The method of claim 1, wherein the depth range includes the near clip.

12. The method of claim 11, wherein the near clip corresponds to about 2.7 diopters.

13. The method of claim 1, further comprising tracking a point of vergence of the user to the set of virtual objects/pixels.

14. A method for displaying a three dimensional ("3D") image, comprising:
analyzing a frame of 3D image data to generate depth data;
identifying a virtual object/pixel having a depth within the 3D image data;
determining a difference/distance between the depth of the virtual object/pixel and a depth of one or both of each a near clip and a far clip;
blurring the virtual object/pixel based on the determined difference/distance between the depth of the virtual object/pixel and the depth of the one or both of each of the near clip and the far clip to generate a blurred virtual object/pixel; and
displaying the blurred virtual object/pixel to the user.

15. The method of claim 14, further comprising:
using the depth data to segment the 3D image data into near and far frames of two dimensional ("2D") image data corresponding to near and far depths respectively,
wherein at least one of the near and far frames of 2D image data including the blurred virtual object/pixel; and
displaying near and far 2D image frames corresponding to the near and far frames of 2D image data at near and far depths to a user respectively.

16. The method of claim 14, wherein the one or both of the near clip and the far clip comprises the near clip.

17. The method of claim 14, wherein the one or both of the near clip and the far clip comprises the far clip.

18. The method of claim 14, wherein the one or both of the near clip and the far clip comprises the near clip and the far clip.

19. The method of claim 14, wherein the virtual object/pixel is blurred as a linear, logarithmic, or asymmetric function of the determined difference/distance between the depth of the virtual object/pixel and the depth of the one or both of each of the near clip and the far clip.

\* \* \* \* \*